(12) United States Patent
Bar-on et al.

(10) Patent No.: US 10,823,597 B2
(45) Date of Patent: Nov. 3, 2020

(54) ULTRASONIC WATER METER INCLUDING A METALLIC OUTER BODY AND POLYMERIC INNER LINING SLEEVE

(71) Applicant: Arad Ltd., Dalia (IL)

(72) Inventors: Omri Bar-on, Hadar Am (IL); David Fogel, Zikhron Ya'akov (IL)

(73) Assignee: Arad Ltd., Dalia (IL)

( * ) Notice: Subject to any disclaimer, the term of this patent is extended or adjusted under 35 U.S.C. 154(b) by 0 days.

(21) Appl. No.: 16/216,700

(22) Filed: Dec. 11, 2018

(65) Prior Publication Data

US 2019/0186968 A1    Jun. 20, 2019

Related U.S. Application Data

(60) Provisional application No. 62/598,719, filed on Dec. 14, 2017.

(51) Int. Cl.
*G01F 1/66* (2006.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| | | | |
|---|---|---|---|
| 5,277,070 A | 1/1994 | Dorr | |
| 6,330,831 B1* | 12/2001 | Lynnworth | G01F 1/662 73/861.28 |
| 7,236,912 B2 | 6/2007 | Froehlich et al. | |
| 7,523,675 B2 | 4/2009 | Sulzer et al. | |
| 7,750,642 B2 | 7/2010 | Graber et al. | |
| 7,866,218 B2 | 1/2011 | Lincoln et al. | |
| 9,714,855 B2 | 7/2017 | Bar-on | |
| 2002/0124661 A1* | 9/2002 | Wagner | G01F 1/662 73/861.23 |
| 2005/0066744 A1* | 3/2005 | Kupnik | G01F 1/662 73/861.03 |
| 2006/0259260 A1* | 11/2006 | Frohlich | G01F 1/66 702/100 |

(Continued)

FOREIGN PATENT DOCUMENTS

| | | |
|---|---|---|
| DE | 19944411 A1 | 4/2001 |
| DE | 10120355 A1 | 10/2002 |
| WO | 2015000487 A1 | 1/2015 |

*Primary Examiner* — Harshad R Patel
(74) *Attorney, Agent, or Firm* — The Webb Law Firm

(57) ABSTRACT

An ultrasonic flow meter device includes a piping arrangement including a tubular body extending along a longitudinal axis from a first end to a second end and including a measurement section disposed intermediate the ends, the tubular body defining a fluid passage extending along the axis through the tubular body from one end to the other; and at least two ultrasonic transducers and at least two reflective elements disposed on opposing sides of the tubular body and spaced apart along the axis. The piping arrangement includes an outer pipe body made from a metallic material and an inner sleeve made from a polymeric material, the inner sleeve being disposed within the outer pipe body. The inner sleeve is over molded within the outer pipe body. The inner sleeve defines the measurement section and the fluid passage of the piping arrangement.

12 Claims, 18 Drawing Sheets

(56) References Cited

U.S. PATENT DOCUMENTS

| | | | |
|---|---|---|---|
| 2008/0271544 A1* | 11/2008 | Rickli | G01F 1/662 73/861.28 |
| 2011/0167926 A1* | 7/2011 | Gotou | G01F 1/662 73/861.18 |
| 2011/0314931 A1* | 12/2011 | Iijima | G01F 1/588 73/861.12 |
| 2016/0161308 A1 | 6/2016 | Schoohf | |
| 2016/0223373 A1* | 8/2016 | Bar-on | G01F 1/667 |
| 2017/0102253 A1* | 4/2017 | Ye | G01F 1/662 |
| 2017/0261358 A1* | 9/2017 | Cham | G01F 1/58 |

* cited by examiner

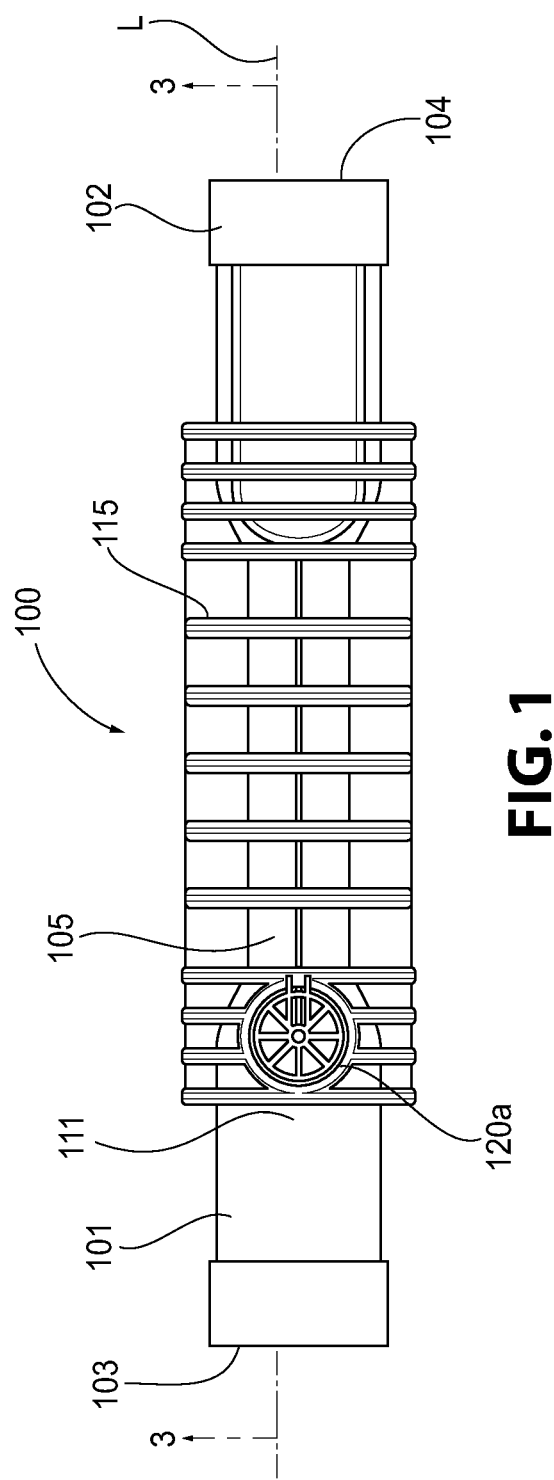
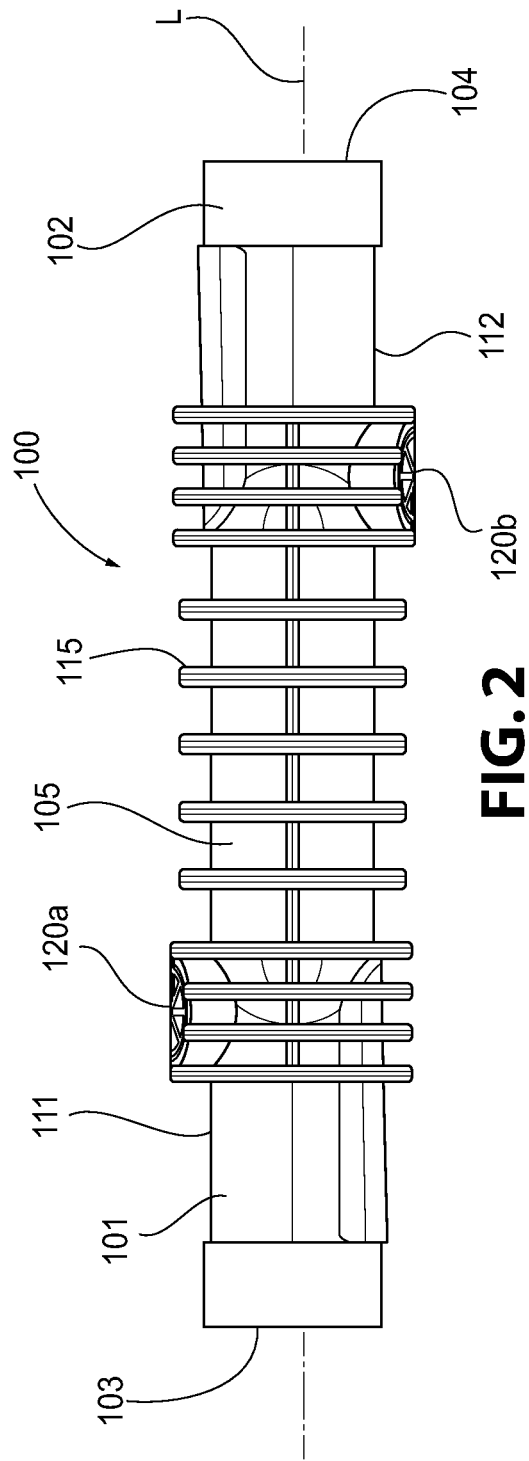

ULTRASONIC WATER METER INCLUDING A METALLIC OUTER BODY AND POLYMERIC INNER LINING SLEEVE

CROSS REFERENCE TO RELATED APPLICATIONS

The present application claims priority to U.S. Provisional Patent Application No. 62/598,719, filed on Dec. 14, 2017, which is incorporated herein by reference in its entirety.

BACKGROUND OF THE INVENTION

Field of the Invention

The present disclosure relates, in general, to a water meter and, in particular, to an ultrasonic water meter used to determine a flow rate of a fluid moving through a piping arrangement.

Description of Related Art

A flow meter, such as a water meter, is a device used to measure the volume or flow rate of a fluid being moved through a piping arrangement. Water meters are typically used to measure the volume of water consumed by residential and commercial buildings that are supplied with water by a public water supply system. Water meters may also be used at the water source or at various locations throughout the water system in order to determine the flows and flow rates delivered through that portion of the system.

There are several types of water meters that are commonly used. Selection of the required water meter is based upon different flow measurement methods, the type of the end user, the required flow rates, as well as upon measurement accuracy requirements. One type of a water meter is an ultrasonic water meter that uses an ultrasonic transducer to send ultrasonic sound waves through the fluid to determine the fluid's velocity and translate the velocity into a measurement of the fluid volume.

U.S. Pat. No. 9,714,855, which is hereby incorporated by reference in its entirety, discloses an ultrasonic water meter in which the ultrasonic sound wave is directed through a measurement section in a Z-shaped travel path and in which the measurement section has a reduced width but the same cross-sectional area as the ends of the meter.

SUMMARY OF THE INVENTION

According to one example of the disclosure, an ultrasonic water meter includes a metallic, stainless steel, brass, or bronze outer pipe body having an over-molded inner portion that defines the flow passage and measurement section of the meter or in which a separate inner sleeve made from a polymeric material is inserted and longitudinally secured. The metallic outer pipe body is provided to improve body strength and/or in accordance with operational requirements of the customer or due to code requirements of the local jurisdiction. This arrangement provides a metallic-type ultrasonic water meter for those customers that request it. It also enables all of the acoustic parts to fit within the inner polymer body, whether the inner polymer body is an inner sleeve inserted into the outer metallic pipe body or is over molded onto an interior surface of the outer metallic pipe body. Further, it has been discovered that a metal meter tube and metal piping will negatively affect the acoustic properties of the meter. The arrangement of the inner polymeric part within the outer metallic pipe body minimizes the negative effect on the acoustic properties of the meter resulting from the metallic material of the outer pipe body.

According to another example of the present disclosure, an ultrasonic water meter includes a metallic body and a polymer inner liner. The polymer inner liner may be an insert or may be over molded onto the metallic body. The metallic body provides strength and allows the meter to be used in installations where a metallic body is required. The polymer inner liner provides acoustic properties similar to those of a plastic ultrasonic meter, minimizing the negative effects of metal on acoustic readings taken in the water passageway. In the example having an over-molded inner liner, the water passageway is completely isolated from the metallic body.

According to a particular example of the present disclosure, an ultrasonic flow meter device is provided. The ultrasonic flow meter device includes a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; at least two ultrasonic transducers disposed on opposing sides of the tubular body and spaced apart along the longitudinal axis; and at least two reflective elements disposed on the opposing sides of the tubular body and spaced apart along the longitudinal axis. The piping arrangement includes an outer pipe body made from a metallic material; and an inner sleeve made from a polymeric material, the inner sleeve being disposed within the outer pipe body. The inner sleeve is over molded within the outer pipe body. The inner sleeve defines the measurement section and the fluid passage of the piping arrangement.

The outer pipe body may include a narrowed portion that defines the measurement section in the over-molded inner sleeve. The metallic material may be stainless steel, brass, or bronze.

According to another particular example of the present disclosure, a method of manufacturing an ultrasonic flow meter device is provided. The method includes providing an outer pipe body made from a metallic material, the outer pipe body having a hollow interior defining an interior surface; injection molding an inner sleeve made from a polymeric material onto the interior surface of the outer pipe body, wherein the outer pipe body and the inner sleeve form a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; assembling at least two ultrasonic transducers on opposing sides of the tubular body and spaced apart along the longitudinal axis; and assembling at least two reflective elements on the opposing sides of the tubular body and spaced apart along the longitudinal axis.

The inner sleeve is injection molded onto the interior surface of the outer pipe body so as to form a sealed engagement between the inner sleeve and the outer pipe body. The metallic material may include stainless steel, brass, or bronze.

According to another particular example of the present disclosure, an ultrasonic flow meter device is provided. The ultrasonic flow meter device includes a piping arrangement including a tubular body extending along a longitudinal axis from a first end to a second end and including a measurement section disposed intermediate the first end and the second end, the tubular body defining a fluid passage extending along the longitudinal axis through the tubular body from the first end to the second end; at least two ultrasonic transducers disposed on opposing sides of the tubular body and spaced apart along the longitudinal axis; and at least two reflective elements disposed on the opposing sides of the tubular body and spaced apart along the longitudinal axis. The piping arrangement includes an outer pipe body made from a metallic material; an inner sleeve made from a polymeric material, the inner sleeve being disposed within the outer pipe body; and a fastener configured to secure the inner sleeve within the outer pipe body. The inner sleeve defines the measurement section and the fluid passage of the piping arrangement. The outer pipe body and the inner sleeve include corresponding apertures that define seats for the at least two ultrasonic transducers and that place the ultrasonic transducers in communication with the measurement section. The outer pipe body includes an aperture and the inner sleeve includes a corresponding recess configured to receive the fastener.

The metallic material may be stainless steel, brass, or bronze. The device may further include a sealing gasket disposed between the outer pipe body and the inner sleeve. The sealing gasket is configured to seal an engagement between an inner surface of the outer pipe body and an exterior surface of the inner sleeve.

These and other features and characteristics of the present invention, as well as the methods of operation and functions of the related elements of structures, and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is a side view of an ultrasonic flow meter in accordance with an example of the present disclosure;

FIG. 2 is a top view of the ultrasonic flow meter of FIG. 1;

DETAILED DESCRIPTION OF THE INVENTION

Figure 3:
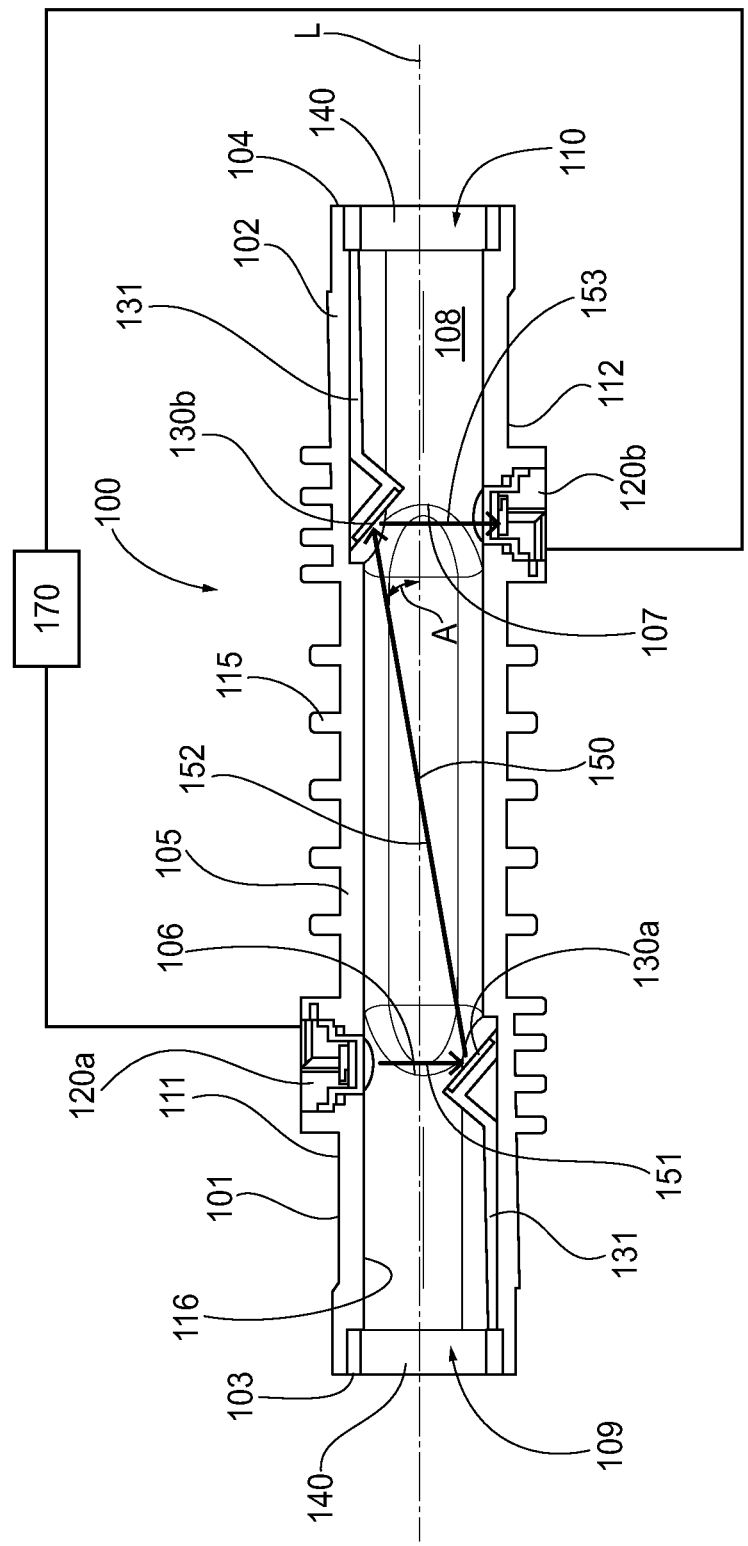
FIG. 3 is a cross-sectional view of the ultrasonic flow meter of FIG. 1 taken along lines 3-3 shown in FIG. 1.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Thermoplastic Ultrasonic Flow Meter Device

With reference to FIGS. 1-6, an ultrasonic flow meter device 100 is shown in accordance with an example of the present disclosure. The ultrasonic flow meter device 100 may be utilized for a variety of purposes, including for determining a flow rate and/or volume of a liquid, such as water, passing through the ultrasonic flow meter 100 in a piping system. The device 100 includes a piping arrangement 101 having a tubular body 102 extending along a longitudinal axis L from a first end 103 to a second end 104.

Figure 5:
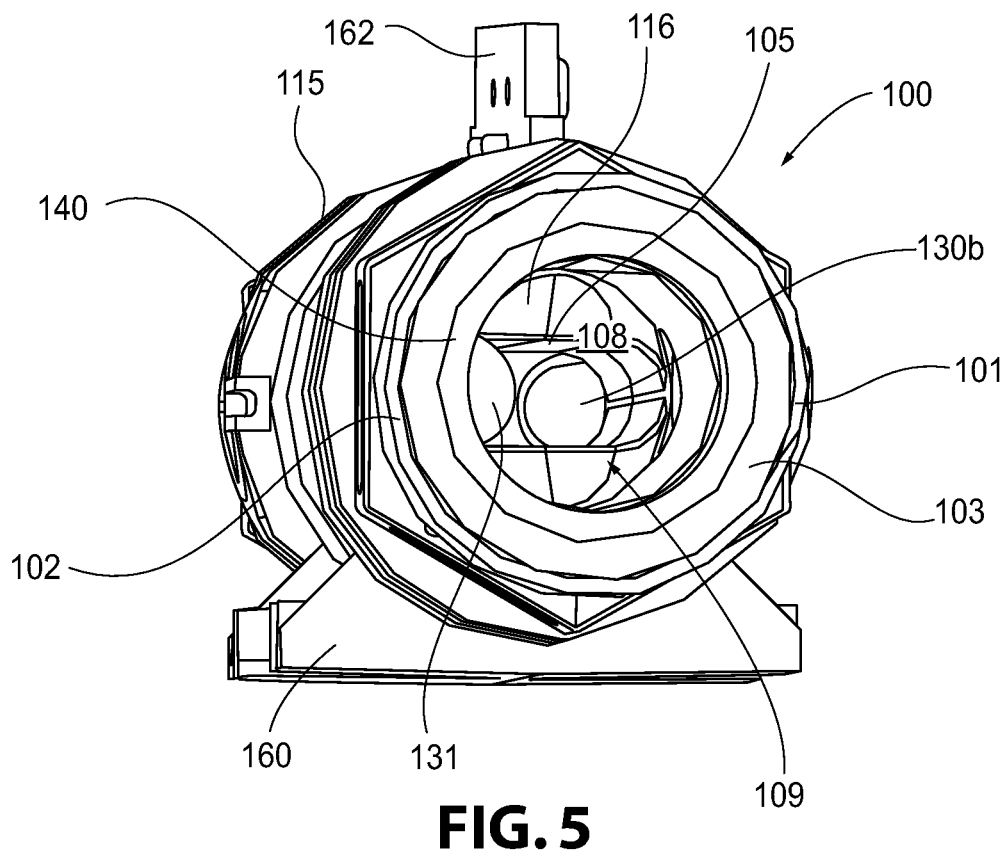
FIG. 5 is a perspective view of the ultrasonic flow meter of FIG. 1.
Figure 6:
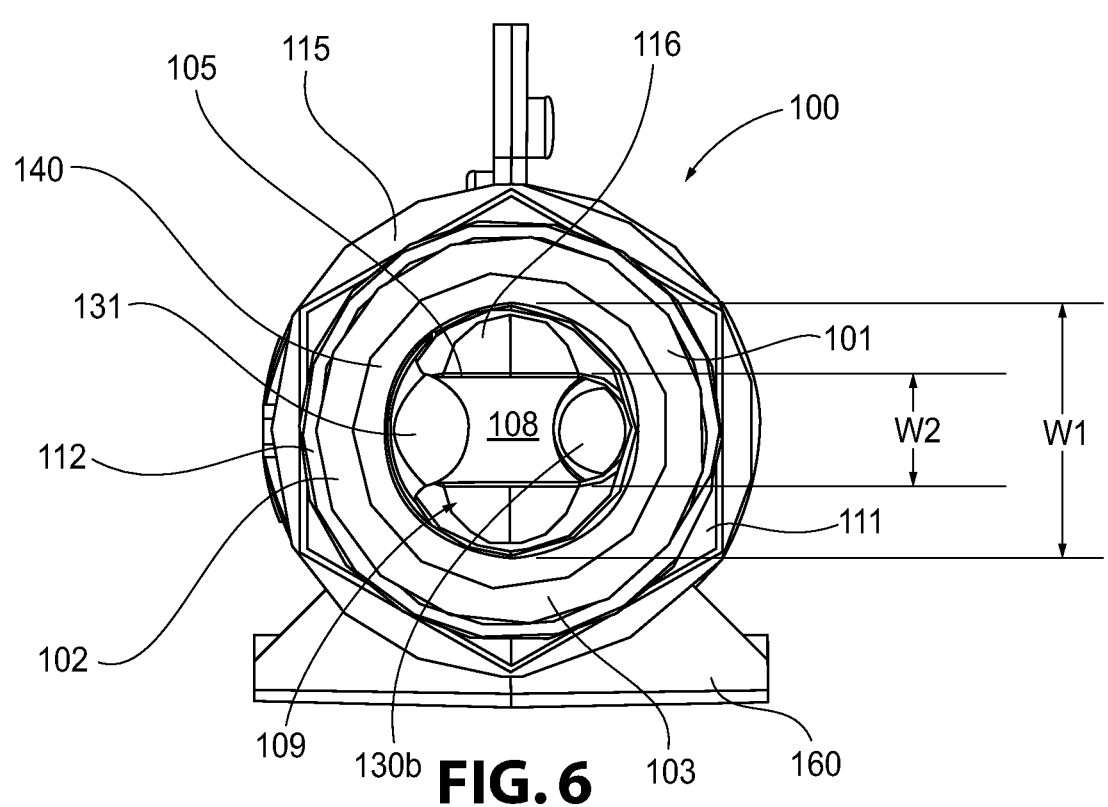
FIG. 6 is a front view of the ultrasonic flow meter of FIG. 1.

The tubular body 102 includes a measurement section 105 disposed within the tubular body 102 intermediate of the first end 103 and the second end 104. The tubular body 102 defines a fluid passage 108 extending along the longitudinal axis L through the tubular body 102 from the first end 103 to the second end 104. The device 100 also includes two ultrasonic transducers 120a, 120b, which are spaced apart along the longitudinal axis L, disposed on opposing sides 111, 112 of the tubular body 102. The device 100 further includes two reflective elements 130a, 130b, which are spaced apart along the longitudinal axis L, disposed on the opposing sides 111, 112 of the tubular body 102. With reference to FIGS. 5 and 6, the piping arrangement 101 may include a base 160 extending from the lower side of the tubular body 102, which is configured to support the piping arrangement 101 on a ground surface. The piping arrangement 101 may also include a bracket 162 extending from the upper side of the tubular body 102. The bracket 162 is configured to support an ancillary device, such as a register 170 (shown in FIG. 3) or an antenna, on the piping arrangement 101.

As shown in FIGS. 1-6, a plurality of fins 115 extend from and around the outer circumferential surface of the tubular body 102. The fins 115 may extend around the entire outer circumferential surface of the tubular body 102. The fins 115 may also only extend around a portion of the outer circumferential surface of the tubular body 102. In one aspect, the fins 115 may be defined as protruding members extending from the outer surface of the tubular body 102. The fins 115 are configured to minimize the expansion of the tubular body 102 due to any increases in temperature or pressure in the fluid passage 108 through the tubular body 102. The fins 115 are also configured to maintain the inner diameter of an interior surface 116 of the tubular body 102.

As shown in FIG. 3, the two ultrasonic transducers 120a, 120b generate and receive, respectively, an ultrasonic sound wave. The two reflective elements 130a, 130b direct the ultrasonic sound wave through the fluid passage 108 in the measurement section 105 of the tubular body 102 from one of the ultrasonic transducers 120a to the other of the ultrasonic transducers 120b in a travel path 150 that is substantially Z-shaped.

The ultrasonic transducers 120a, 120b are configured to emit an ultrasonic sound wave through the tubular body 102 and to receive the ultrasonic sound wave that is emitted. One ultrasonic transducer 120a may be specifically configured as a transmitter to emit the ultrasonic sound wave, while the other 120b may be specifically configured as a sensor or receiver to receive the ultrasonic sound wave. Alternatively, both ultrasonic transducers 120a, 120b may be configured as transceivers capable of both transmitting and receiving an ultrasonic sound wave. The two reflective elements 130a, 130b are made of a metal material or are coated with a metal or otherwise reflective surface that renders the reflective elements 130a, 130b suitable for reflecting an ultrasonic sound wave.

Figure 4:
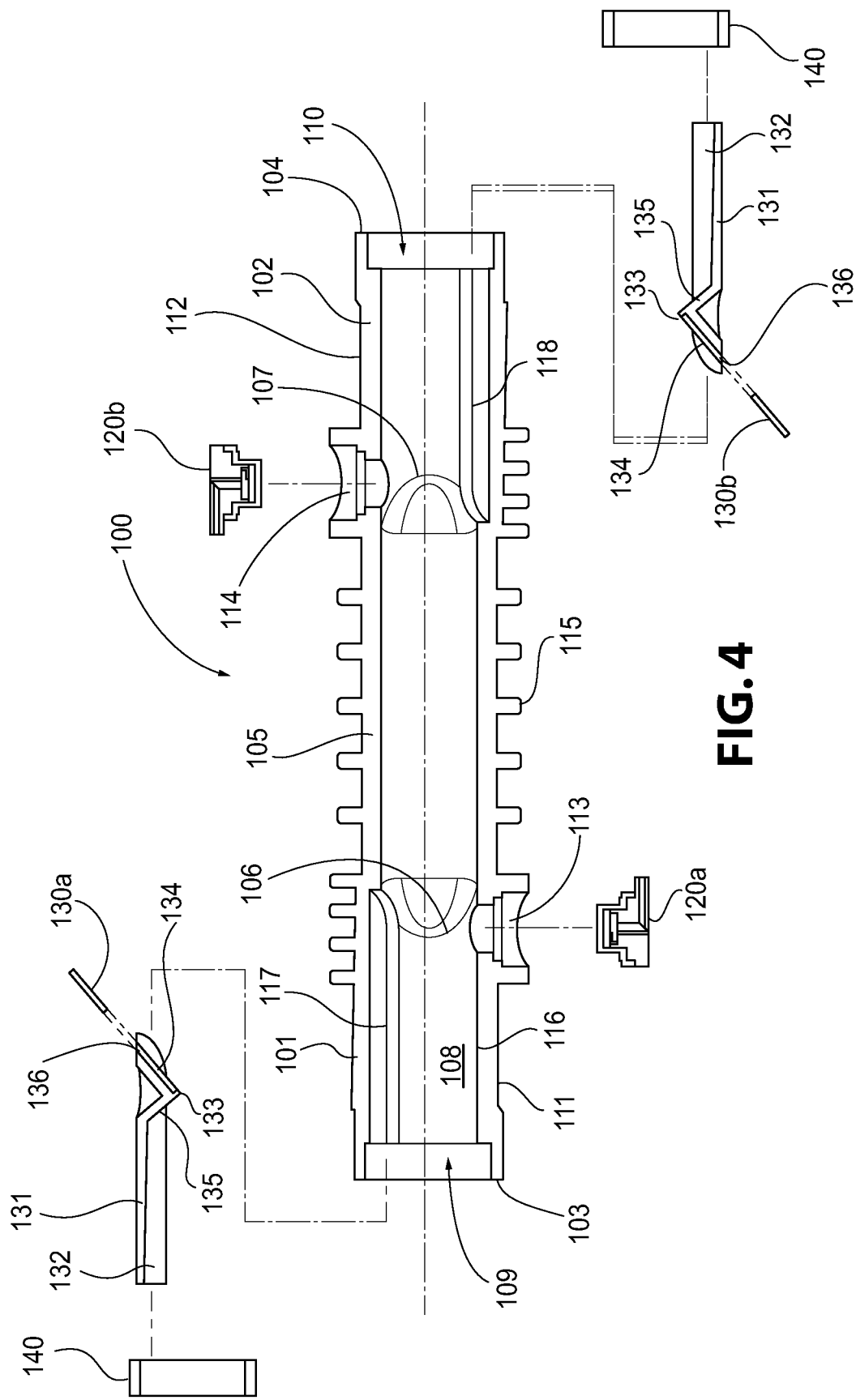
FIG. 4 is an exploded cross-sectional view of the ultrasonic flow meter of FIG. 1.

In particular, as shown in FIG. 3, the two ultrasonic transducers 120a, 120b are disposed at opposing ends 106, 107 of the measurement section 105 on opposing sides 111, 112 of the tubular body 102. In particular, as shown in FIG. 4, the two ultrasonic transducers 120a, 120b are disposed in respective recesses 113, 114 formed in the opposing sides 111, 112 of the tubular body 102. The ultrasonic transducers 120a, 120b and the recesses 113, 114 are configured such that the transducers 120a, 120b extend into the fluid passage 108 by a minimal amount so as to minimize the head loss/disruption of flow through the fluid passage 108 caused by the presence of the ultrasonic transducers 120a, 120b. Similarly, the two reflective elements 130a, 130b are also disposed at the opposing ends 106, 107 of the measurement section 105 and on opposing sides 111, 112 of the tubular body 102. The reflective elements 130a, 130b are disposed on the tubular body 102 opposite to a respective one of the two ultrasonic transducers 120a, 120b. In particular, the reflective elements 130a, 130b may be substantially aligned with respective ultrasonic transducers 120a, 120b such that the entire ultrasonic sound wave emitted from the ultrasonic transducers 120a, 120b may be received by the reflective elements 130a, 130b, thereby providing a more accurate reading of the travel path 150 of the ultrasonic sound wave through the tubular body 102.

As such, the travel path 150 of the ultrasonic sound wave through the measurement section 105 includes a first segment 151 extending laterally across the measurement section 105 from the first ultrasonic transducer 120a to the first reflective element 130a, a second segment 152 extending laterally and longitudinally at an angle A with respect to the longitudinal axis L from the first reflective element 130a to the second reflective element 130b, which is disposed on the opposite end 107 of the measurement section 105 and on an opposite side 111 of the tubular body 102 from the first reflective element 130a, and a third segment 153 extending laterally across the measurement section 105 from the second reflective element 130b to the second ultrasonic transducer 120b. According to the example shown, the angle A of the second segment 152 of the travel path 150 with respect to the longitudinal axis L is approximately 9°.

This travel path 150 is directed in the same direction as the flow of liquid through the ultrasonic flow meter 100. The travel path 150 could be directed in an opposite direction to calculate the flow rate of the reverse backflow of water through the ultrasonic flow meter 100. In this aspect, the second ultrasonic transducer 120b would emit and direct laterally an ultrasonic sound wave toward the second reflective element 130b. The second reflective element 130b may direct the ultrasonic sound wave at the angle A across the fluid passage 108 of the tubular body 102 toward the first reflective element 130a. The first reflective element 130a may then direct the ultrasonic sound wave laterally toward the first ultrasonic transducer 120a.

It is to be appreciated however, that this angle A may be adjusted based on several factors, including the desired length of the measurement section 105, and, thus, may be of any value known to be suitable to one having ordinary skill in the art. It is also to be appreciated that the exact configuration of the ultrasonic transducers 120a, 120b and the reflective elements 130a, 130b may be adjusted in order to alter the exact shape of the travel path 150. For instance, the reflective elements 130a, 130b need not be precisely aligned with the respective ultrasonic transducers 120a, 120b in the longitudinal direction and may instead be spaced from the transducers 120a, 120b in the longitudinal direction. Accordingly, the term "substantially" as used herein is used to encompass slight variations in the shape of the travel path 150 including the above-described precise Z-shape. It is also to be appreciated that additional ultrasonic transducers and/or reflective elements may be provided to the extent known to be suitable to one having ordinary skill in the art for achieving the above-described travel path 150.

The amount of time it takes for the ultrasonic sound wave to move through the liquid that flows through the ultrasonic flow meter 100 may be determined using the ultrasonic transducers 120a, 120b. The ultrasonic transducers 120a, 120b may measure the average time it takes for the ultrasonic sound wave to move through the measurement section 105 of the tubular body 102. The velocity of the liquid flowing through the ultrasonic flow meter 100 may be determined by dividing the measured distance of the travel path 150 of the ultrasonic sound wave by the measured transit time between the pulses of ultrasonic sound waves propagating into and against the direction of liquid flow. Using the calculated velocity, the flow rate of the liquid through the measurement section 105 may be determined.

The ultrasonic flow meter 100, shown in FIGS. 1-6, may have a high beam or sound wave efficiency due to several reasons regarding the arrangement of the ultrasonic flow meter 100. Since the ultrasonic flow meter 100 uses two reflective elements 130a, 130b, instead of three reflective elements, there is minimal acoustic damping of the ultrasonic sound waves through the measurement section 105. During operation of the ultrasonic flow meter 100, the ultrasonic sound wave emitted from the ultrasonic transducers 120a, 120b may experience acoustic damping when directed against a reflective element 130a, 130b. Due to the acoustic damping, the ultrasonic sound wave may become weaker as the ultrasonic sound wave moves along the travel path 150, thereby affecting the measurements of the ultrasonic transducers 120a, 120b. Therefore, the fewer reflective surfaces 130a, 130b that are used, the stronger the ultrasonic sound wave may remain, thereby providing a more accurate reading regarding the time taken to move through the ultrasonic flow meter 100.

The ultrasonic flow meter 100 may also have a high beam or sound wave efficiency since the ultrasonic sound wave covers the entire flow section. As shown in FIG. 3, the first reflective element 130a directs the ultrasonic sound wave laterally and longitudinally at an angle A toward the second reflective element 130b. Therefore, the entire second segment 152 of the travel path 150 of the ultrasonic sound wave is directed within a restricted cross section of the ultrasonic flow meter 100. As shown with angle A in FIG. 3, the ultrasonic sound wave is diverted approximately 9° from the longitudinal axis L and the flow direction. In one aspect, the ultrasonic sound wave travels substantially parallel with the flow of water through the tubular body 102. Since the ultrasonic sound wave is offset from the cross flow of the water by this smaller angle, a more accurate and extended measurement of the velocity profile of the ultrasonic sound wave through the measurement section may be obtained by the ultrasonic transducers 120a, 120b. Further, by positioning the second segment 152 of the travel path 150 of the ultrasonic sound wave along the longitudinal axis L of the fluid passage 108 through the middle of the tubular body 102, it ensures that the ultrasonic transducers 120a, 120b are always wet. To obtain an accurate reading along the travel path 150 of the ultrasonic sound wave, the ultrasonic transducers 120a, 120b and the reflective elements 130a, 130b should remain wet to ensure that the ultrasonic sound wave travels through the same medium throughout the entire travel path 150. It is undesirable to have the ultrasonic sound wave travel through air trapped in the tubular body 102, which may occur on the surfaces of the ultrasonic transducers 120a, 120b or the reflective elements 130a, 130b. Similarly, the travel path 150 of the ultrasonic sound wave is configured to move along the center line of the longitudinal axis L of the tubular body 102 so the ultrasonic sound wave does not travel through any air bubbles that are trapped in the piping arrangement 101.

A register 170 operatively connected to the ultrasonic transducers 120a, 120b, as shown in FIG. 3, may be provided to operate the ultrasonic transducers 120a, 120b to emit and receive an ultrasonic sound wave. The register 170 may incorporate a controller microprocessor configured to transmit commands to the ultrasonic transducers 120a, 120b to emit and receive an ultrasonic wave. The controller within the register 170 may also receive signals from the ultrasonic transducers 120a, 120b indicating that an ultrasonic sound wave has been transmitted and received. The controller within the register 170 may also be programmed to act as means for measuring the speed of the ultrasonic sound wave through the measurement section 105 and also for calculating the flow rate of the liquid flowing through the piping arrangement 101 based on the measured speed of the ultrasonic sound wave. The register 170 may also incorporate a power source, such as a battery, for powering the controller and for powering the ultrasonic transducers 120a, 120b. Alternatively, the ultrasonic transducers 120a, 120b may be in communication with a remote register via an antenna mounted on the tubular body 102. The antenna may transmit information to the receiver via a low power radio signal, or via BLUETOOTH® or similar low power communications protocol, or via a Wi-Fi connection. Alternatively, the ultrasonic transducers 120a, 120b may be in communication with the remote register via a capacitive link. In the case that the register is provided remotely, the power source may be incorporated directly in or on the tubular body 102.

As shown in FIGS. 1-6, the fluid passage 108 includes an inlet 109 defined at the first end 103 of the tubular body 102 and an outlet 110 defined at the second end 104 of the tubular body 102. As shown in FIG. 6, the fluid passage 108 has a first width W1 at the inlet 109 and the outlet 110, and a second width W2 in the measurement section 105 of the tubular body 102. The first width W1 of the fluid passage 108 at the inlet 109 and the outlet 110 is larger than the second width W2 of the fluid passage 108 through the measurement section 105. In particular, as shown in FIGS. 3 and 6, the fluid passage 108 has a circular cross-sectional shape at the inlet 109 and the outlet 110, and an oval or oblong circular shape in the measurement section 105. The interior surface 116 of the tubular body 102 is sloped at the first end 106 and the second end 107 of the measurement section 105 where the fluid passage 108 transitions between the oval and oblong circular shapes.

A cross-sectional area of the fluid passage 108 is the same throughout the entire length of the tubular body 102 along the longitudinal axis L, including at the inlet 109 and the outlet 110 and through the measurement section 105. The reduction in width of the fluid passage 108 in the measurement section 105 allows for a more uniform flow of liquid through the measurement section 105 and alleviates swirling and eddying of the flow through the measurement section 105, which may disrupt transmission of the ultrasonic sound wave. The cross-sectional area of the fluid passage 108 is maintained along its entire longitudinal length, including through the measurement section 105, in order to avoid changing the flow rate of the liquid (speeding up and slowing down) as the liquid enters and leaves the measurement section 105.

In particular, the measurement section 105 is configured to create an elliptical flow of liquid through the tubular body 102 in the measurement section 105. The elliptical liquid flow may move from the top of the tubular body 102 to the bottom of the tubular body 102, instead of side to side in the tubular body 102. The cross section of the fluid passage 108 through the measurement section 105 broadens laterally between the opposing sides 111, 112 of the tubular body 102. The elliptical water flow provides a more accurate measurement of the time it takes for the ultrasonic sound wave to travel through the measurement section 105 because a substantial amount of the water flow is moving along the travel path 150 of the ultrasonic sound wave. During operation of the ultrasonic flow meter 100, the liquid flow may become turbulent moving through the tubular body 102. Due to this turbulence in the water, air bubbles may be created, which float to the top of the tubular body 102. By using an elliptical water flow, however, any bubbles created by turbulent flow of the water may be directed to the top of the tubular body 102, instead of the sides 111, 112 of the tubular body 102 that hold the reflective elements 130*a*, 130*b* and ultrasonic transducers 120*a*, 120*b*.

With reference to FIGS. 3 and 4, the two reflective elements 130*a*, 130*b* are each disposed on a respective bracket 131 inserted into the fluid passage 108 from a respective end 103, 104 of the tubular body 102. Each bracket 131 is removably inserted in a respective slot 117, 118 defined in the interior surface 116 of the tubular body 102 and extending along the longitudinal axis L from a respective one of the first end 103 and second end 104 of the tubular body 102 to the measurement section 105. Each bracket 131 includes a body portion 132 that is slidable into the respective slots 117, 118 and an inclined portion 133 that holds one of the reflective elements 130*a*, 130*b* such that the reflective elements 130*a*, 130*b* may extend into the fluid passage 108 of the tubular body 102.

The reflective elements 130*a*, 130*b* do not extend so far into the fluid passage 108 as to block the fluid passage 108. The reflective elements 130*a*, 130*b* are suitably arranged and positioned so as to minimize the area of the fluid passage 108 that is blocked by the reflective elements 130*a*, 130*b*. By minimizing the area of the fluid passage 108 that is blocked by the reflective elements 130*a*, 130*b*, a more uniform flow of fluid may pass through the ultrasonic flow meter 100.

The inclined portion 133 of each bracket 131 defines an inclined surface 134 that holds the respective reflective element 130*a*, 130*b* at an angle with respect to the longitudinal axis L that is appropriate for directing the ultrasonic sound beam along the substantially Z-shaped travel path 150, as discussed above. The respective reflective element 130*a*, 130*b* is assembled on the bracket 131 by sliding the reflective element 130*a*, 130*b* through a slot 136 defined in the bottom of the body portion 132 of the bracket 131 at the base of the inclined portion 133 leading to the inclined surface 134. Alternatively, the reflective elements 130*a*, 130*b* may be secured to the respective inclined surface 134 by an adhesive or may be molded into the respective bracket 131.

The inclined portion 133 of each bracket 131 also defines an opposing inclined surface 135 that is angled and shaped to minimize the head loss created by the inclined portion 133 extending into the fluid passage 108 of the tubular body 102. In particular, the opposing inclined surface 135 of the bracket 131 is configured to minimize the area of the fluid passage 108 that is blocked and to maintain a more uniform flow through the fluid passage 108.

Each bracket 131 is held in place within the respective slot 117, 118 by forming a friction fit with the slot 117, 118 to allow for easy installation and removal of the brackets 131 from the tubular body 102. End rings 140 are also inserted into each of the ends 103, 104 of the tubular body 102 to assist in retaining the brackets 131 in place in the tubular body 102. The interior surface 116 of the tubular body 102 is partially recessed at the ends 103, 104 in order to form a shoulder within the internal diameter of the tubular body 102 at each of the ends 103, 104 for receiving the end rings 140. It is to be appreciated that the reflective elements 130*a*, 130*b* may be assembled into the piping arrangement 101 via other techniques, such as being inserted through slots in the tubular body 102 or by being assembled onto bodies inserted into recesses defined in the tubular body 102, or according to any other assembly technique found to be suitable by those having ordinary skill in the art.

Figure 7:
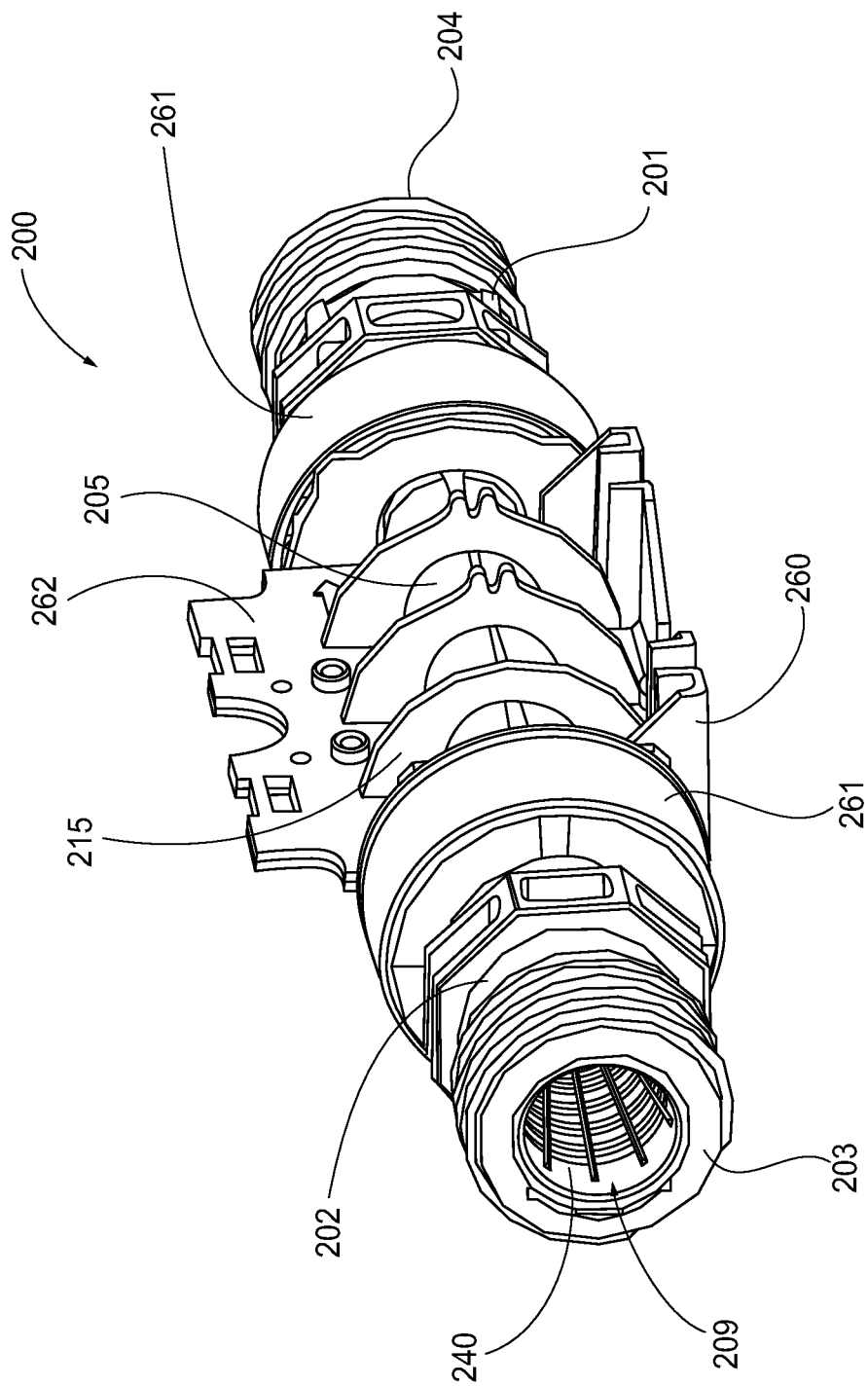
FIG. 7 is a perspective view of an ultrasonic flow meter in accordance with another example of the present disclosure.
Figure 8:
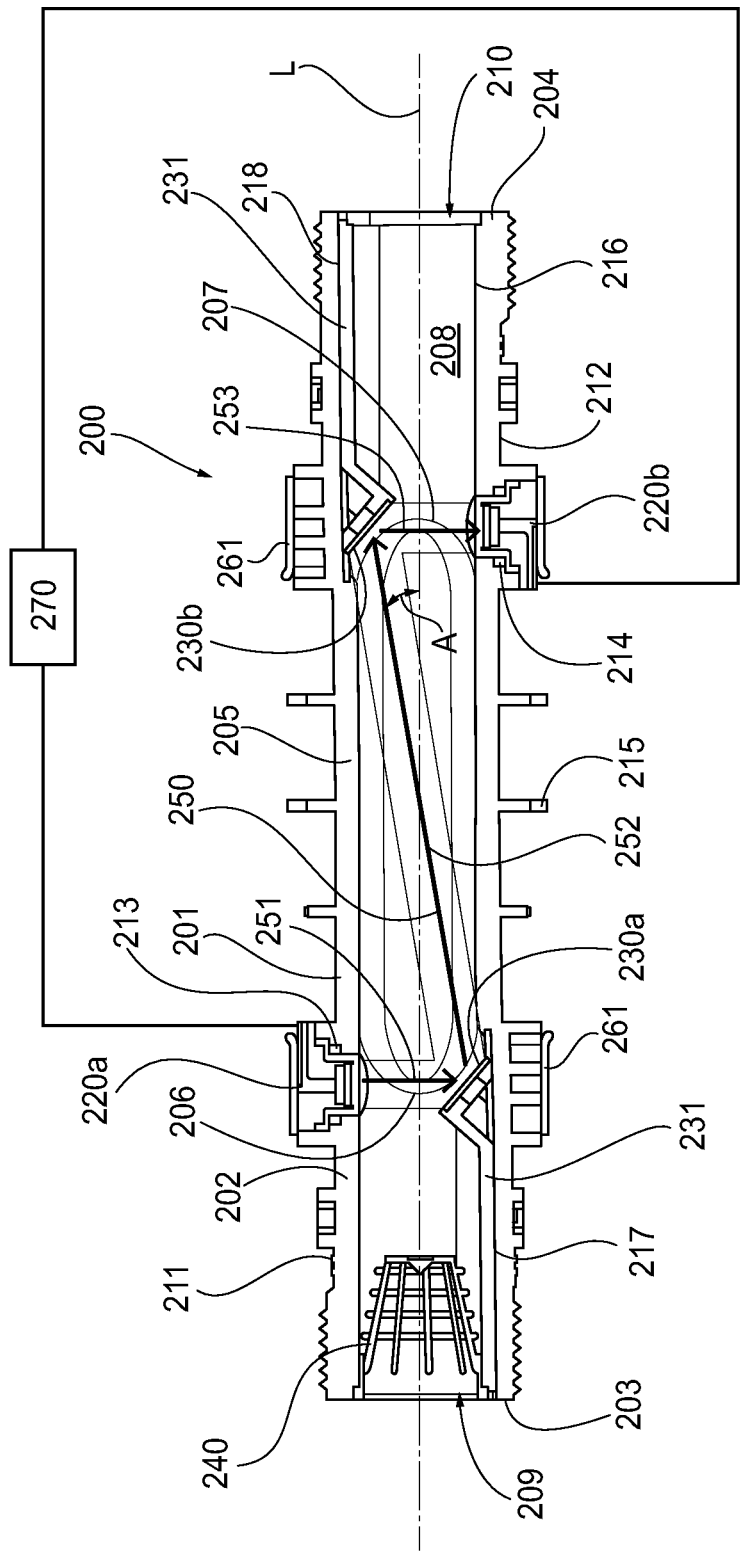
FIG. 8 is a cross-sectional view of the ultrasonic flow meter of FIG. 7.

With reference to FIGS. 7 and 8, an ultrasonic flow meter 200 is shown in accordance with another example of the disclosure. The ultrasonic flow meter 200, shown in FIGS. 7 and 8, is substantially similar to the ultrasonic flow meter 100 discussed above with reference to FIGS. 1-6 except as to certain aspects, which will be discussed in additional detail below. Accordingly, the above-discussed aspects of the ultrasonic flow meter 100 shown in FIGS. 1-6 should be considered as being applicable to the ultrasonic flow meter 200 shown in FIGS. 7 and 8, and vice versa, unless explicitly stated otherwise.

As shown in FIG. 7, the ultrasonic flow meter 200 includes a piping arrangement 201 having a tubular body 202 extending along a longitudinal axis L from a first end 203 to a second end 204. The tubular body 202 includes a measurement section 205 disposed within the tubular body 202 intermediate of the first end 203 and the second end 204. The tubular body 202 defines a fluid passage 208 extending along the longitudinal axis L through the tubular body 202 from the first end 203 to the second end 204. The device 200 also includes two ultrasonic transducers 220*a*, 220*b*, which are spaced apart along the longitudinal axis L, disposed on opposing sides 211, 212 of the tubular body 202. The device 200 further includes two reflective elements 230*a*, 230*b*, which are spaced apart along the longitudinal axis L, disposed on the opposing sides 211, 212 of the tubular body 202. With reference to FIG. 7, the piping arrangement 201 may include a base 260 extending from the lower side of the tubular body 202, which is configured to support the piping arrangement 201 on a ground surface. A plurality of fins 215 for strength and rigidity extend from and around the outer circumferential surface of the tubular body 202. The piping arrangement 201 may also include a bracket 262 extending from the upper side of the tubular body 202. The bracket 262 is configured to support an ancillary device, such as a register 270 (shown in FIG. 8) or an antenna, on the piping arrangement 201.

As shown in FIG. 8, the two ultrasonic transducers 220*a*, 220*b* generate and receive, respectively, an ultrasonic sound wave. The two reflective elements 230*a*, 230*b* direct the ultrasonic sound wave through the fluid passage 208 in the measurement section 205 of the tubular body 202 from one of the ultrasonic transducers 220*a* to the other of the ultrasonic transducers 220*b* in a travel path 250 that is substantially Z-shaped.

In particular, the ultrasonic transducers 220*a*, 220*b* are configured to emit an ultrasonic sound wave through the tubular body 202 and to receive the ultrasonic sound wave that is emitted. One ultrasonic transducer 220*a* may be specifically configured as a transmitter to emit the ultrasonic sound wave, while the other 220*b* may be specifically configured as a sensor or receiver to receive the ultrasonic sound wave. Alternatively, both ultrasonic transducers 220*a*, 220*b* may be configured as transceivers capable of both transmitting and receiving an ultrasonic sound wave. The two reflective elements 230*a*, 230*b* are made of a metal material or are coated with a metal or otherwise reflective surface that renders the reflective elements 230*a*, 230*b* suitable for reflecting an ultrasonic sound wave.

In particular, as shown in FIG. 8, the two ultrasonic transducers 220*a*, 220*b* are disposed at opposing ends 206, 207 of the measurement section 205 on opposing sides 211, 212 of the tubular body 202. In particular, the two ultrasonic transducers 220a, 220b are disposed in respective recesses 213, 214 formed in the opposing sides 211, 212 of the tubular body 202. The two ultrasonic transducers may be retained in the respective recesses 213, 214 by bands 261 extending around the outer circumferential surface of the tubular body 202 over the ultrasonic transducers 220a, 220b, as shown in FIGS. 7 and 8. The bands 261 may also serve to protect the transducers 220a, 220b from environmental wear and damage.

The two reflective elements 230a, 230b are also disposed at the opposing ends 206, 207 of the measurement section 205 and on opposing sides 211, 212 of the tubular body 202. The reflective elements 230a, 230b are disposed on the tubular body 202 opposite to a respective one of the two ultrasonic transducers 220a, 220b. In particular, the reflective elements 230a, 230b may be substantially aligned with respective ultrasonic transducers 220a, 220b such that the entire ultrasonic sound wave emitted from the ultrasonic transducers 220a, 220b may be received by the reflective elements 230a, 230b, thereby providing a more accurate reading of the travel path 250 of the ultrasonic sound wave through the tubular body 202.

As such, the travel path 250 of the ultrasonic sound wave through the measurement section 205 includes a first segment 251 extending laterally across the measurement section 205 from the first ultrasonic transducer 220a to the first reflective element 230a, a second segment 252 extending laterally and longitudinally at an angle A with respect to the longitudinal axis L from the first reflective element 230a to the second reflective element 230b, which is disposed on the opposite end 207 of the measurement section 205 and on an opposite side 211 of the tubular body 202 from the first reflective element 230a, and a third segment 253 extending laterally across the measurement section 205 from the second reflective element 230b to the second ultrasonic transducer 220b. According to the example shown, the angle A of the second segment 252 of the travel path 250 with respect to the longitudinal axis L is approximately 9°.

A register 270 operatively connected to the ultrasonic transducers 220a, 220b, as shown in FIG. 8, may be provided to operate the ultrasonic transducers 220a, 220b to emit and receive an ultrasonic sound wave. The register 270 may incorporate a controller microprocessor configured to transmit commands to the ultrasonic transducers 220a, 220b to emit and receive an ultrasonic wave. The controller within the register 270 may also receive signals from the ultrasonic transducers 220a, 220b indicating that an ultrasonic sound wave has been transmitted and received. The controller within the register 270 may also be programmed to act as means for measuring the speed of the ultrasonic sound wave through the measurement section 205 and also for calculating the flow rate of the liquid flowing through the piping arrangement 201 based on the measured speed of the ultrasonic sound wave. The register 270 may also incorporate a power source, such as a battery, for powering the controller and for powering the ultrasonic transducers 220a, 220b. Alternatively, the ultrasonic transducers 220a, 220b may be in communication with a remote register via an antenna mounted on the tubular body 202. The antenna may transmit information to the receiver via a low power radio signal, or via BLUETOOTH® or similar low power communications protocol, or via a Wi-Fi connection. Alternatively, the ultrasonic transducers 220a, 220b may be in communication with the remote register via a capacitive link. In the case that the register is provided remotely, the power source may be incorporated directly in or on the tubular body 202.

As shown in FIGS. 7 and 8, the fluid passage 208 includes an inlet 209 defined at the first end 203 of the tubular body 202 and an outlet 210 defined at the second end 204 of the tubular body 202. As discussed above with respect to the ultrasonic flow meter 100 as shown in FIG. 6, the fluid passage 208 has a first width at the inlet 209 and the outlet 210, and a second width in the measurement section 205 of the tubular body 202. The first width of the fluid passage 208 at the inlet 209 and the outlet 210 is larger than the second width of the fluid passage 208 through the measurement section 205. In particular, the fluid passage 208 has a circular cross-sectional shape at the inlet 209 and the outlet 210, and an oval or oblong circular shape in the measurement section 205. An interior surface 216 of the tubular body 202 is sloped at the first end 206 and the second end 207 of the measurement section 205 where the fluid passage 208 transitions between the oval and oblong circular shapes.

A cross-sectional area of the fluid passage 208 is the same throughout the entire length of the tubular body 202 along the longitudinal axis L, including at the inlet 209 and the outlet 210 and through the measurement section 205. The reduction in width of the fluid passage 208 in the measurement section 205 allows for a more uniform flow of liquid through the measurement section 205 and alleviates swirling and eddying of the flow through the measurement section, which may disrupt transmission of the ultrasonic sound wave. The cross-sectional area of the fluid passage 208 is maintained along its entire longitudinal length, including through the measurement section 205, in order to avoid changing the flow rate of the liquid (speeding up and slowing down) as the liquid enters and leaves the measurement section 205.

As shown in FIGS. 7 and 8, a strainer element 240 may be provided at the inlet 209 of the fluid passage 208 and disposed within a shoulder defined in the interior surface 216 of the tubular body 202 at the first end 203 of the tubular body 202. The strainer element 240 is provided at the inlet 209 in order to prevent larger debris carried in the flow of liquid, such as rocks or gravel, from passing through the tubular body 202 to the measurement section 205 where the debris might damage the ultrasonic transducers 220a, 220b or the reflective elements 230a, 230b.

With reference to FIGS. 8-11, the two reflective elements 230a, 230b are each disposed on a respective bracket 231 inserted into the fluid passage 208 from a respective end 203, 204 of the tubular body 202. Each bracket 231 is removably inserted in a respective slot 217, 218 defined in the interior surface 216 of the tubular body 202 and extending along the longitudinal axis L from a respective one of the first end 203 and the second end 204 of the tubular body 202 to the measurement section 205. Each bracket 231 includes a body portion 232 that is slidable into the respective slots 217, 218 and an inclined portion 233 that holds one of the reflective elements 230a, 230b such that the reflective elements 230a, 230b may extend into the fluid passage 208 of the tubular body 202.

Figure 9:
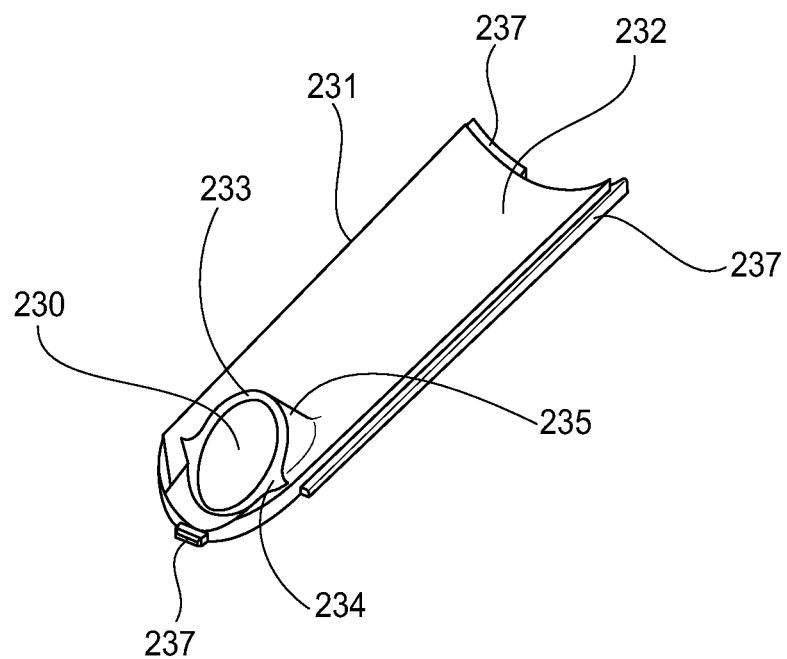
FIG. 9 is a perspective view of a reflective element and bracket assembly of the ultrasonic flow meter of FIG. 7.
Figure 10:
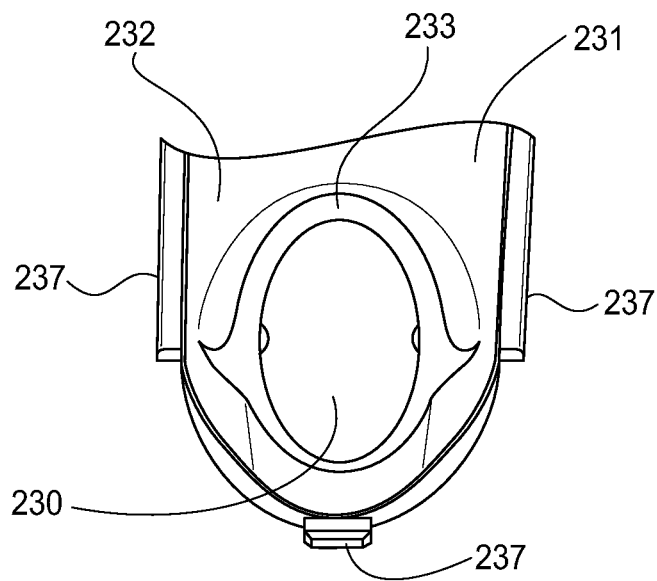
FIG. 10 is an enlarged view of a portion of the reflective element and bracket assembly of FIG. 9.
Figure 11:
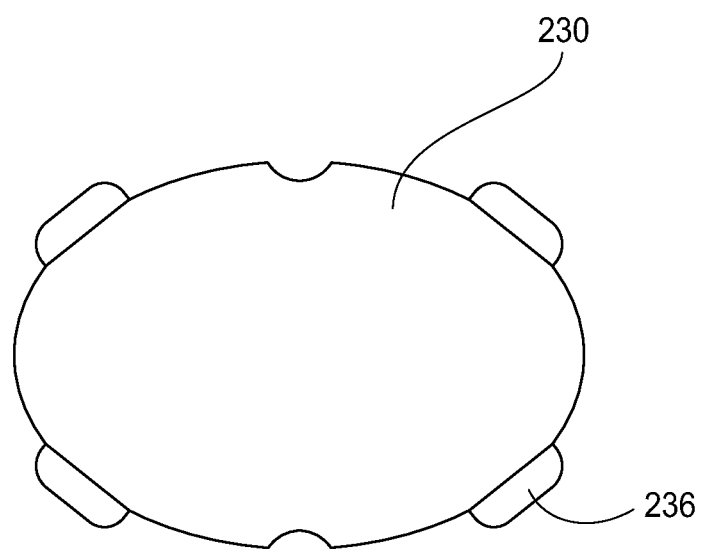
FIG. 11 is a front view of a reflective element of the assembly of FIG. 9.

As shown in FIGS. 9 and 10, the inclined portion 233 of the bracket 231 defines an inclined surface 234 that holds a reflective element 230 at an angle with respect to the longitudinal axis L that is appropriate for directing the ultrasonic sound beam along the substantially Z-shaped travel path 250, as discussed above. The reflective element 230 is molded into the inclined portion 233 of the bracket 231. To that end, the reflective element 230 may include a plurality of tabs 236, shown in FIG. 11, for forming a positive engagement between the reflective element 230 and the bracket 231 as the bracket 231 is molded around the reflective element 230. Additionally, as shown in FIG. 11, the reflective element 230 is symmetric in order to simplify the process of molding to the bracket 231.

As shown in FIG. 9, the inclined portion 233 of the bracket 231 also defines an opposing inclined surface 235 that is angled and shaped to minimize the head loss created by the inclined portion 233 extending into the fluid passage 208 of the tubular body 202. In particular, the opposing inclined surface 235 of the bracket 231 is configured to minimize the area of the fluid passage 208 that is blocked and maintain a more uniform flow through the fluid passage 208.

With reference to FIGS. 8-10, each bracket 231 is held in place within the respective slot 217, 218 by forming a friction fit with the slot 217, 218 to allow for easy installation and removal of the brackets 231 from the tubular body 202. Additionally, each bracket 231 includes a plurality of protrusions 237 on the sides of the body 232 of the bracket 231 and at the end of the body 232. The protrusions 237 of the brackets 231 slide into corresponding recesses (not shown) formed with the slots 217, 218 in the interior surface 216 of the tubular body 202 and engage the recesses to retain the brackets 231 within the slots 217, 218.

According to one example of the disclosure, the piping arrangement 101, 201 is made from a plastic material. In particular, the piping arrangement 101, 201 may be made from an injected fiber thermoplastic, such as Polyphenylene Sulfide (PPS) or Polyphthalamide (PPA). The piping arrangement 101, 201 may also be made from Polyvinyl Chloride (PVC) piping. The piping arrangement 101, 201 may be a unitary molded polymeric glass, such as fiberglass. The piping arrangement 201, 202 may be a portion of a larger piping network configured to provide water to residential or commercial buildings. The ultrasonic flow meter 100, 200 may be a modular unit that is installed into pre-existing piping arrangements.

The ultrasonic flow meter 100, 200 has a high structural stability that assists in creating an even flow of water through the ultrasonic flow meter 100, 200. The ultrasonic flow meter 100, 200 also provides a highly accurate measurement of the velocity of the water flow through the tubular body 102, 202. This highly accurate measurement allows for a highly accurate calculation of the flow rate of the liquid through the tubular body 102, 202. Further, the ultrasonic flow meter 100, 200 experiences a lower head loss in the water flow through the tubular body 102, 202, which creates a more stable flow of water through the ultrasonic flow meter 100, 200. A more stable flow of liquid allows the ultrasonic flow meter 100, 200 to obtain a more accurate measurement of the velocity of liquid flow, which would be made more difficult with more turbulence in the stream of liquid. The head loss of the liquid flow is reduced in the ultrasonic flow meter 100, 200 by minimizing the distance that the reflective elements 130a, 130b, 230a, 230b extend into the fluid passage 108, 208. By reducing the portion of the reflective elements 130a, 130b, 230a, 230b that is exposed in the fluid passage 108, 208, the obstructions in the fluid passage 108, 208 that could create a head loss in the liquid flow are also reduced. Further, by reducing the portion of the reflective elements 130a, 130b, 230a, 230b that is exposed in the fluid passage 108, 208, an operator of the ultrasonic flow meter 100, 200 is capable of seeing through the fluid passage 108, 208 of the tubular body 102, 202 from the inlet 109, 209 to the outlet 110, 210. Since there are minimal obstructions in the fluid passage 108, 208, the operator may look through the tubular body 102, 202 from end to end for inspection or maintenance of the ultrasonic flow meter 100, 200.

With reference to FIGS. 1-11, a method of assembling an ultrasonic flow meter 100, 200 according to an example of the disclosure includes removably inserting the brackets 131, 231 carrying the reflective elements 130a, 130b, 230a, 230b into the slots 117, 118, 217, 218 formed in the interior surface 116, 216 of the tubular body 102, 202. End rings 140 may be inserted in the first end 103 and the second end 104 of the tubular body 102 to retain the brackets 131 in the slots 117, 118. The ultrasonic transducers 120a, 120b, 220a, 220b are inserted into the respective recesses 113, 114, 213, 214 defined in the opposing sides 111, 112, 211, 212 of the tubular body 102, 202. Bands 261 may then be placed about the outer circumferential surface of the tubular body 202 to retain the ultrasonic transducers 220a, 220b in place. The tubular body 102, 202 may then be installed in a larger piping system (not shown).

With further reference to FIGS. 1-11, a method of measuring a flow rate of a liquid through a flow meter device 100, 200 includes providing a flow meter device 100, 200 as described above with reference to either FIGS. 1-6 or FIGS. 7-11. The method further includes creating a flow of liquid through the piping arrangement 101, 201; generating an ultrasonic sound wave with one of the ultrasonic transducers 120a, 220a; directing the ultrasonic sound wave with the reflective elements 130a, 130b, 230a, 230b along a travel path 150, 250 through the fluid passage 108, 208 in the measurement section 105, 205 of the tubular body 102, 202 from the ultrasonic transducers 120a, 220a generating the ultrasonic sound wave to the other ultrasonic transducers 120b, 220b, the travel path 150, 250 being substantially Z-shaped; receiving the ultrasonic sound wave at the other ultrasonic transducers 120b, 220b; measuring a speed of the ultrasonic sound wave through the measurement section 105, 205; and calculating the flow rate of the liquid based on the measured speed of the ultrasonic sound wave. According to one example of the disclosure, the ultrasonic transducers 120a, 120b, 220a, 220b are in communication with a register 170, 270, which includes a controller microprocessor that commands the ultrasonic transducers 120a, 120b, 220a, 220b to transmit the ultrasonic sound wave and receives data from the ultrasonic transducers 120a, 120b, 220a, 220b to measure the speed of the ultrasonic sound wave through the measurement section 105, 205 and to calculate the flow rate of the liquid through the measurement section 105, 205 based on the measured speed. According to this example, the controller microprocessor acts as the means for measuring the speed and calculating the flow rate of the liquid.

Metal and Thermoplastic Ultrasonic Flow Meter Device

Certain installations of an ultrasonic flow meter device require that the device have a greater material strength or durability than can be provided with a purely thermoplastic construction and thus necessitate that the device be provided with a metal construction. Also, the local codes and laws of certain jurisdictions require that installed water meters have a metal construction. Accordingly, a purely thermoplastic ultrasonic flow meter device is not a solution for all consumers. However, it has been observed that metal material negatively affects the acoustic properties of an ultrasonic flow meter, which interferes with the accurate measurement of flow in an ultrasonic flow meter device. According to the example of FIGS. 12-33 of the present disclosure, an ultrasonic flow meter device 500, 600 is provided that includes a metal outer construction to meet demands of material strength and/or local code and a polymeric/thermoplastic inner construction that provides for improved acoustic properties for transmitting an ultrasonic wave through the meter device in comparison to a purely metal construction.

With reference to FIGS. 12-21, an ultrasonic flow meter device 500 is shown in accordance with an example of the present disclosure. The ultrasonic flow meter device 500 shown in FIGS. 12-21 is substantially similar to the ultrasonic flow meter 100, 200 discussed above with reference to FIGS. 1-11 except as to certain aspects, which will be discussed in additional detail below. The device 500 includes a piping arrangement 501 having a tubular body 502 extending along a longitudinal axis from a first end 503 to a second end 504. An inlet 508 of the piping arrangement 501 is formed at the first end 503 and an outlet 509 is formed at the second end 504. The tubular body 502 includes a measurement section 532 disposed within the tubular body 502 intermediate of the first end 503 and the second end 504. The tubular body 502 defines a fluid passage 531 extending along the longitudinal axis through the tubular body 502 from the first end 503 to the second end 504.

The device 500 also includes two ultrasonic transducers 523, 524, which are spaced apart along the longitudinal axis, disposed on opposing sides 506, 507 of the tubular body 502. According to one example, the ultrasonic transducers 523, 524 of the device 500 are the same as the ultrasonic transducers 120a, 120b, 220a, 220b discussed above with reference to the examples of FIGS. 1-11. The device 500 further includes two reflective elements (not shown in FIGS. 12-21), which are spaced apart along the longitudinal axis, disposed on the opposing sides 506, 507 of the tubular body 502. According to one example, the reflective elements provided with the device 500 are the same as the reflective elements 230 discussed above with reference to the example of FIGS. 7-11.

Figure 18:
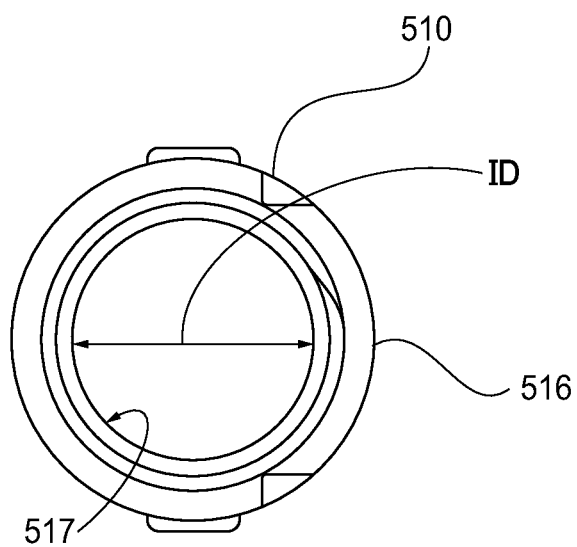
FIG. 18 is a front view of the outer pipe body of FIG. 16.

With reference to FIGS. 12-21, the piping arrangement 501 of the device 500 includes an outer pipe body 510 made from a metal material. The outer pipe body 510 is a round or cylindrical pipe having an exterior 516 and an interior surface 517 that defines an interior diameter ID, as shown in FIG. 18. According to an example of the present disclosure, the metal material is stainless steel, brass, or bronze, though it is to be appreciated that any suitable metal material, such as iron or aluminum may be used to form the outer pipe body 510. As shown in FIGS. 12-15 and 19-21, the piping arrangement 501 also includes an inner sleeve 530 made from a polymeric material. The inner sleeve 530 is disposed within the outer pipe body 510. The inner sleeve 530 has an exterior surface 533 defining an outer diameter OD and an interior surface 534. The piping arrangement 501 further includes a fastener 525 provided to longitudinally secure the inner sleeve 530 within the outer pipe body 510. The inner sleeve 530 defines the measurement section 532 and the fluid passage 531 of the piping arrangement 501 such that negative effects of the metal material of the outer pipe body 510 on the transmission of the ultrasonic wave between the ultrasonic transducers 523, 524 is minimized, if not eliminated.

Figure 12:
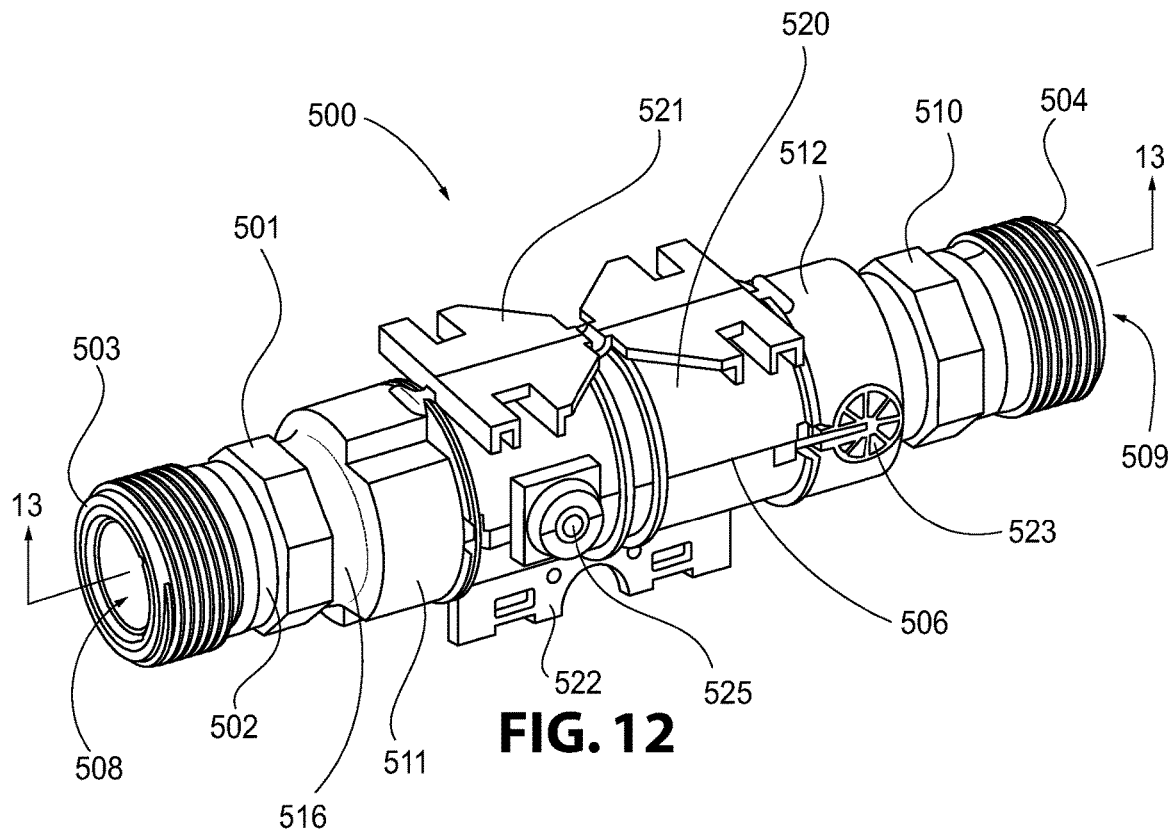
FIG. 12 is a perspective view of an ultrasonic flow meter in accordance with another example of the present disclosure.
Figure 13:
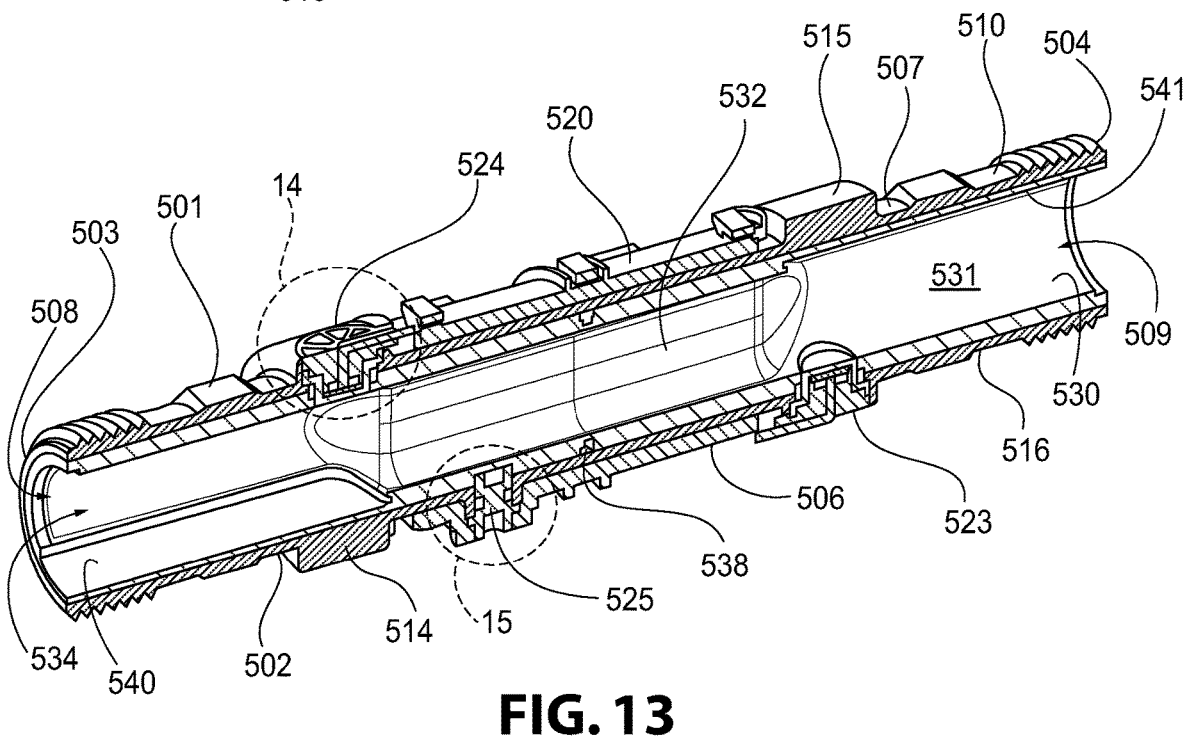
FIG. 13 is a cross-sectional view of the ultrasonic flow meter of FIG. 12 taken along lines 13-13 shown in FIG. 12.
Figure 14:
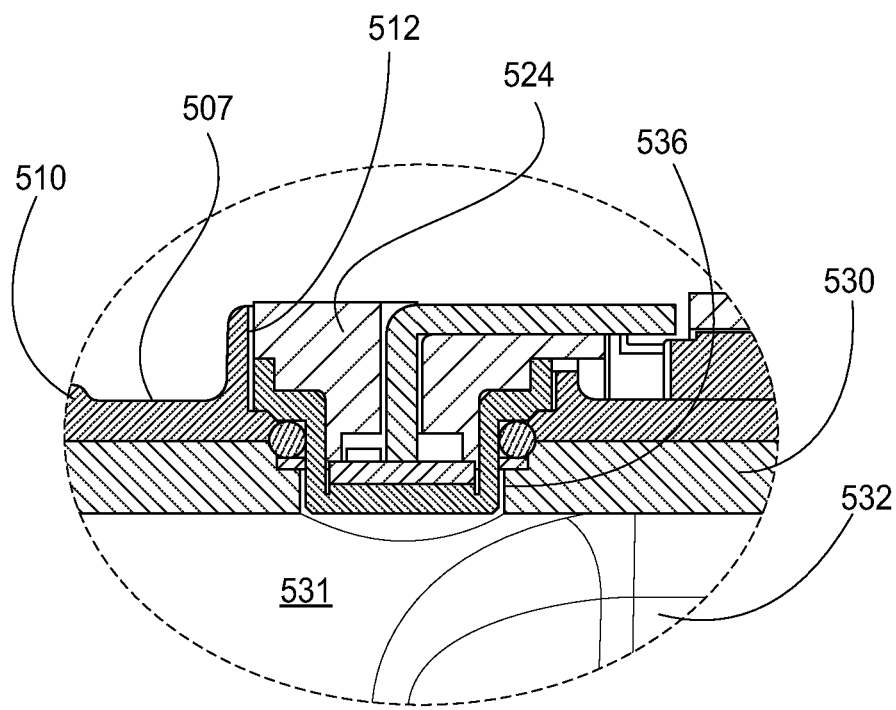
FIG. 14 is an enlarged view of the area '14' shown in FIG. 13.

As shown in FIGS. 12 and 13, the piping arrangement 501 may also include an outer part 520 disposed around a central portion of an exterior 516 of the outer pipe body 510. The outer part 520 may be formed from a suitable material and includes a base 521 extending from the lower side of the tubular body 502, which is configured to support the piping arrangement 501 on a ground surface. The outer part 520 may also include a bracket 522 extending from the upper side of the tubular body 502. The bracket 522 is configured to support an ancillary device, such as a register or antenna (not shown), on the piping arrangement 502.

As discussed above with reference to the examples of FIGS. 1-11, the ultrasonic transducers 523, 524 and the reflective elements are arranged within the piping arrangement 501 to direct an ultrasonic sound wave through the fluid passage 531 in the measurement section 532 of the tubular body 502 from one of the ultrasonic transducers 523 to the other of the ultrasonic transducers 524 in a travel path that is substantially Z-shaped.

As shown in FIGS. 12 and 13 and as discussed above with reference to the examples of FIGS. 1-11, the ultrasonic transducers 523, 524 are disposed at opposing ends of the measurement section 532 on opposing sides 506, 507 of the tubular body 502. As shown in FIGS. 12-17, the outer pipe body 510 includes bands 514, 515 surrounding the exterior 516 of the outer pipe body 510. Each of the bands 514, 515 includes a respective recess/aperture 511, 512 defined therein for receiving the transducers 523, 524 therein for supporting the transducers 523, 524 on the piping arrangement 501. The inner sleeve 530 includes corresponding apertures 535, 536 extending through the inner sleeve 530 (see FIG. 20). Each aperture 535, 536 of the inner sleeve 530 aligns with a respective recess/aperture 511, 512 of the outer pipe body 510. The respective recess/aperture 511, 512 of the outer pipe body 510 and apertures of the inner sleeve 530 define seats for the ultrasonic transducers 523, 524 and place the ultrasonic transducers 523, 524 in communication with the measurement section 532.

Figure 20:
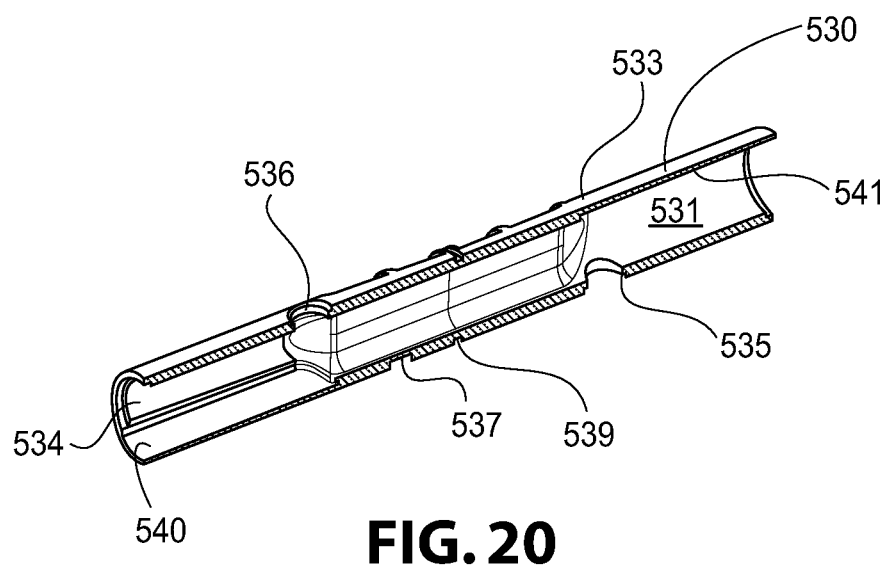
FIG. 20 is a cross-sectional view of the inner sleeve of FIG. 19 taken along lines 20-20 shown in FIG. 19.
Figure 21:
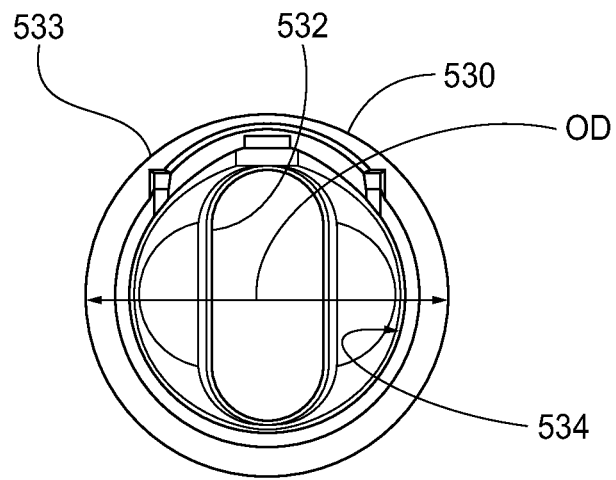
FIG. 21 is a front view of the inner sleeve of FIG. 19.

As shown in FIGS. 13 and 20, the inner sleeve 530 includes a first slot 540 and a second slot 541 defined in the interior surface 534. The first and second slots 540, 541 are similar to the slots 217, 218 discussed above with reference to the example of FIGS. 7-11 and are configured to receive the brackets 231 supporting the reflective elements 230 within the fluid passage 531 at the ends of the measurement section 532.

According to an example of the present disclosure, the transducers 523, 524, reflective elements, and the measurement section 532 of the ultrasonic flow meter device 500 are arranged and configured to direct flow and transmit a Z-shaped ultrasonic wave in the same manner as the corresponding components of the ultrasonic flow meter devices 100, 200 discussed above with reference to FIGS. 1-11 such that the ultrasonic flow meter device 500 operates and measures flow in the same manner as the ultrasonic flow meter devices 100, 200 discussed above with reference to FIGS. 1-11. According to this example, the measurement section 532 has the same shape and configuration as the measurement sections 105, 205 of the above-discussed devices 100, 200. Also according to this example, the ultrasonic transducers 523, 524 are configured to communicate with a register (not shown) for measuring flow through the device 500 and transmitting measurement information to a utility, as discussed in detail above.

Figure 15:
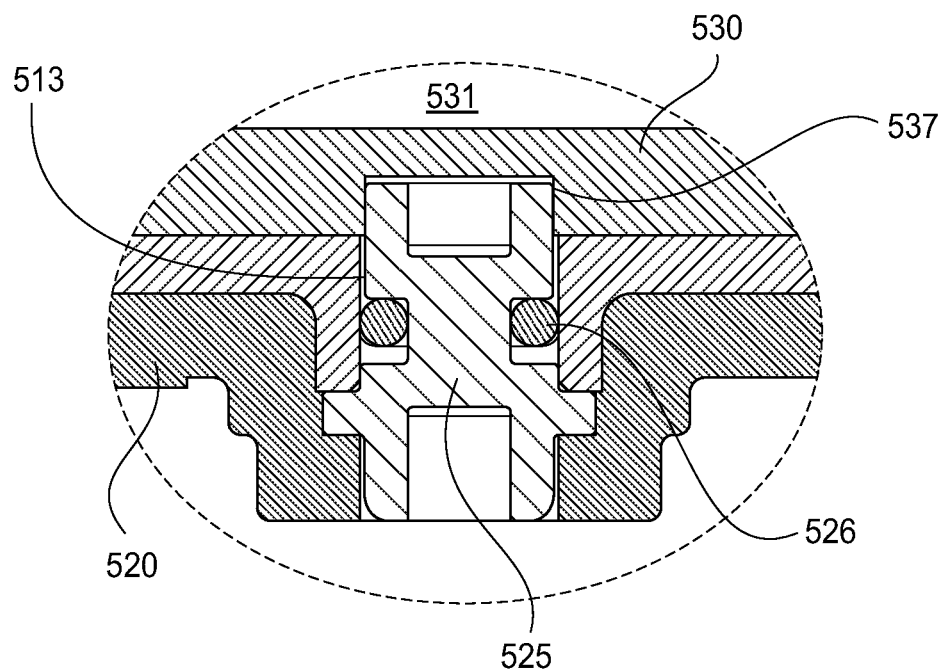
FIG. 15 is an enlarged view of the area '15' shown in FIG. 13.
Figure 16:
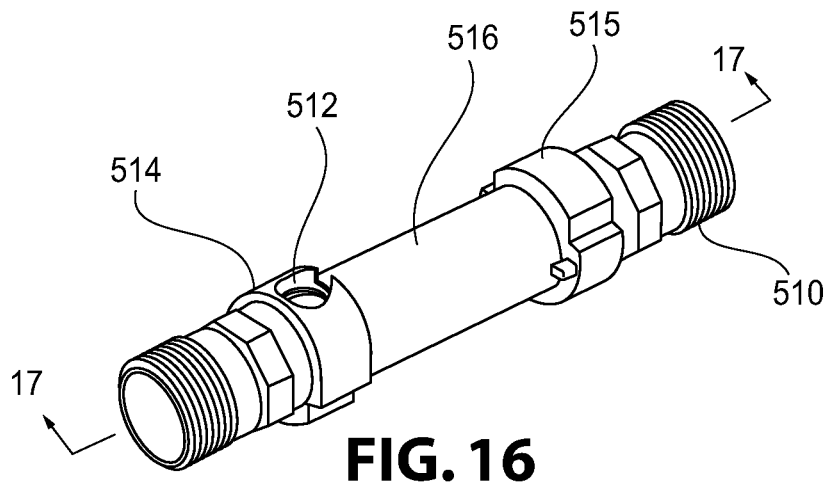
FIG. 16 is a perspective view of an outer pipe body of the ultrasonic flow meter of FIG. 12.
Figure 17:
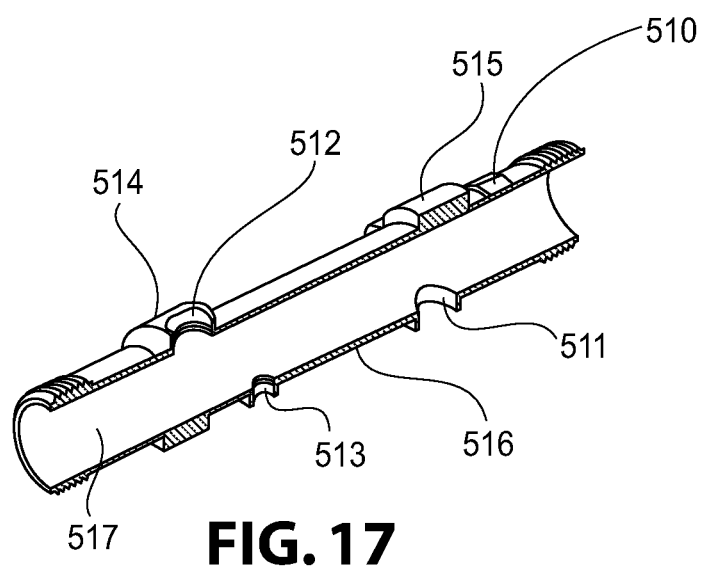
FIG. 17 is a cross-sectional view of the outer pipe body of FIG. 16 taken along lines 17-17 shown in FIG. 16.

With reference to FIGS. 12-21, the device 500 is assembled by inserting the inner sleeve 530 into the outer pipe body 510. The inner sleeve 530 includes a recess 537 defined in the exterior surface 533 that aligns with a recess/aperture 513 formed in the outer pipe body 510. The recess/aperture 513 in the outer pipe body 510 and the recess 537 in the inner sleeve 530 receive the fastener 525, which longitudinally secures the inner sleeve 530 within the outer pipe body 510. A sealing member or gasket 526 is disposed on the fastener 525 to seal the engagement between the fastener 525 and the outer pipe body 510 to minimize leakage through the recess/aperture 513. The assembly of the fastener 525 within the recess/aperture 513 of the outer pipe body 510 and the recess 537 of the inner sleeve 510 also aligns the recesses/apertures 511, 512 in the outer pipe body 510 with the respective apertures 535, 536 in the inner sleeve 530 to allow for the transducers 523, 524 to be assembled on the piping arrangement 501 in communication with the measurement section 532, as discussed above. As shown in FIGS. 12, 13, and 15, the outer part 520 is assembled on the outer pipe body 510 over the fastener 525.

Figure 19:
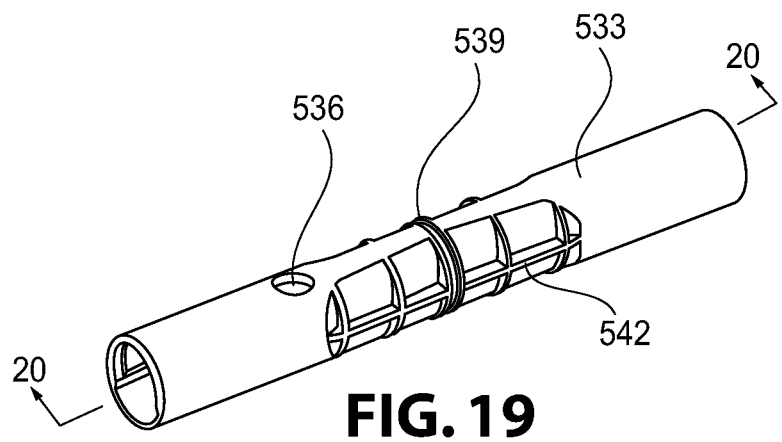
FIG. 19 is a perspective view of an inner sleeve of the ultrasonic flow meter of FIG. 12.

As shown in FIGS. 12-21, the outer diameter OD of the exterior surface 533 of the inner sleeve 530 is chosen so as to provide as close a fit with the interior diameter ID of the interior surface 517 of the outer pipe body 510 as possible while still allowing the inner sleeve 530 to be inserted into the outer pipe body 510 in order to minimize leakage between the inner sleeve 530 and the outer pipe body 510. A circumferential groove 539 is defined in the exterior surface 533 of the inner sleeve 530. The groove 539 receives a sealing member or gasket 538 therein. When the inner sleeve 530 is inserted into the outer pipe body 510, the gasket 538 is engaged between the exterior surface 533 of the inner sleeve 530 and the interior surface 517 of the outer pipe body 510 in order to seal the engagement between the exterior surface 533 of the inner sleeve and the interior surface 517 of the outer pipe body 510 and further minimize leakage between the inner sleeve 530 and the outer pipe body 510. Also, as shown in FIG. 19, the inner sleeve 530 may be formed with a plurality of fins 542 arranged in a grid pattern on the exterior surface 533 at the measurement section 532. The fins 542 are provided to structurally reinforce the inner sleeve 530 at the measurement section 532 and conform the outer dimension of the inner sleeve 530 at the measurement section 532 to the outer diameter OD for purposes of assembly of the inner sleeve 530 within the outer pipe body 510.

With reference to FIGS. 22-30, an ultrasonic flow meter device 600 is shown in accordance with an example of the present disclosure. The ultrasonic flow meter device 600 shown in FIGS. 22-30 is substantially similar to the ultrasonic flow meter 100, 200 discussed above with reference to FIGS. 1-11 except as to certain aspects, which will be discussed in additional detail below. The device 600 includes a piping arrangement 601 having a tubular body 602 extending along a longitudinal axis from a first end 603 to a second end 604. An inlet 607 of the piping arrangement 601 is formed at the first end 603, and an outlet 608 is formed at the second end 604. The tubular body 602 includes a measurement section 632 disposed within the tubular body 602 intermediate of the first end 603 and the second end 604. The tubular body 602 defines a fluid passage 631 extending along the longitudinal axis through the tubular body 602 from the first end 603 to the second end 604.

The device 600 also includes two ultrasonic transducers 620, 621, which are spaced apart along the longitudinal axis, disposed on opposing sides 605, 606 of the tubular body 602. According to one example, the ultrasonic transducers 620, 621 of the device 600 are the same as the ultrasonic transducers 120a, 120b, 220a, 220b discussed above with reference to the examples of FIGS. 1-11. The device 600 further includes two reflective elements (not shown in FIGS. 22-30), which are spaced apart along the longitudinal axis, disposed on the opposing sides 605, 606 of the tubular body 602. According to one example, the reflective elements provided within the device 600 are the same as the reflective elements 230 discussed above with reference to the example of FIGS. 7-11.

With reference to FIGS. 22-30, the piping arrangement 601 of the device 600 includes an outer pipe body 610 made from a metal material. The outer pipe body 610 is a round or cylindrical pipe formed with a narrowed oval-shaped portion 613 at the location of the measurement section 632 within the tubular body 602. The outer pipe body 610 has an exterior 616 and an interior surface 617. According to an example of the present disclosure, the metal material is stainless steel, brass, or bronze, though it is to be appreciated that any suitable metal material, such as iron or aluminum, may be used to form the outer pipe body 610. The piping arrangement 601 also includes an inner sleeve 630 made from a polymeric material. The inner sleeve 630 is disposed within the outer pipe body 610. In particular, the inner sleeve 630 is over molded onto the interior surface 617 of the outer pipe body 610 via an injection molding process. The inner sleeve 630 is molded with an interior surface 634 that defines the measurement section 632 and the fluid passage 631 of the piping arrangement 601 such that the negative effects of the metal material of the outer pipe body 610 on the transmission of the ultrasonic wave between the ultrasonic transducers 620, 621 is minimized, if not eliminated. Although not shown, it is to be appreciated that the device 600 may further include an outer part similar to the outer part 520 discussed above with reference to FIGS. 12-21 assembled on the exterior 616 of the outer pipe body 610.

As discussed above with reference to the examples of FIGS. 1-11, the ultrasonic transducers 620, 621 and the reflective elements are arranged within the piping arrangement 601 to direct an ultrasonic sound wave through the fluid passage 631 in the measurement section 632 of the tubular body 602 from one of the ultrasonic transducers 620 to the other of the ultrasonic transducers 621 in a travel path that is substantially Z-shaped.

Figure 22:
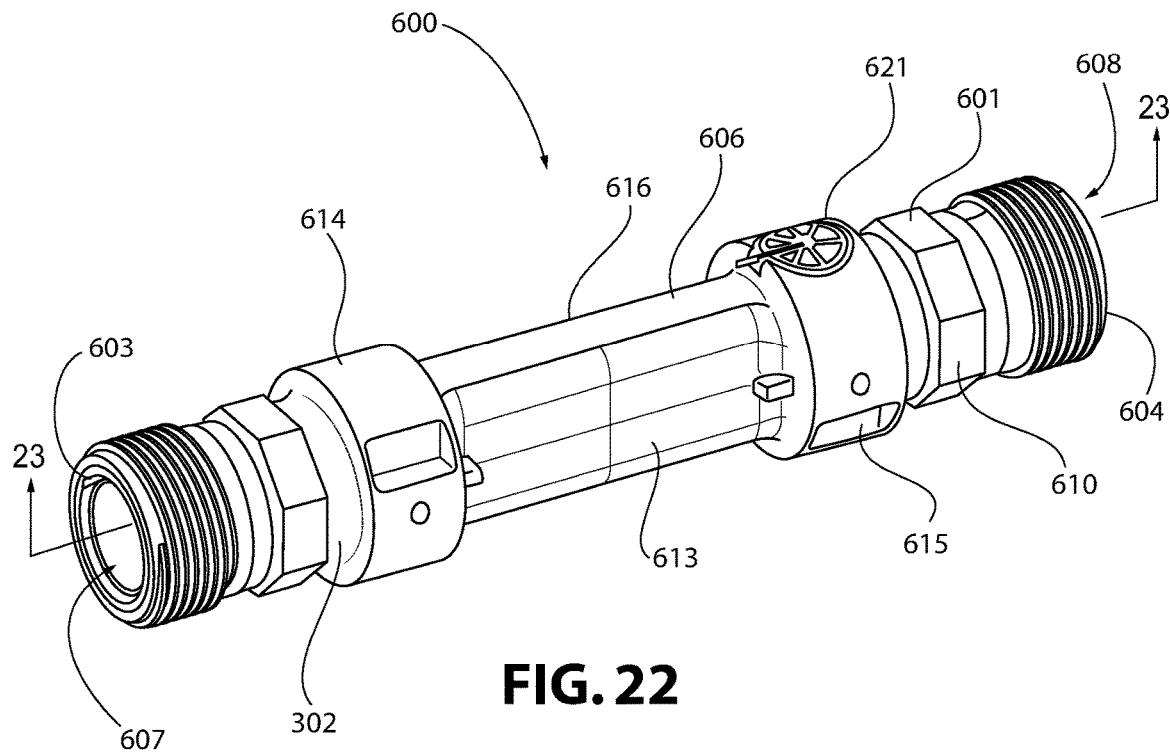
FIG. 22 is a perspective view of an ultrasonic flow meter in accordance with another example of the present disclosure.
Figure 23:
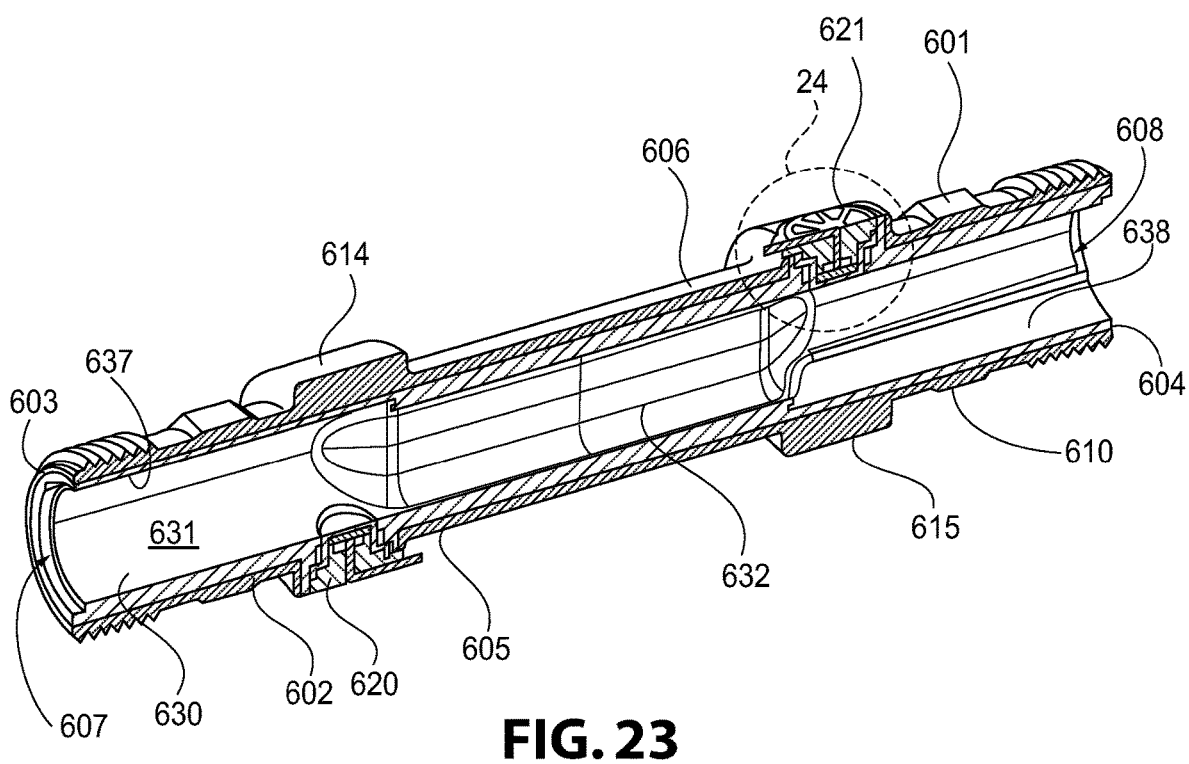
FIG. 23 is a cross-sectional view of the ultrasonic flow meter of FIG. 22 taken along lines 23-23 shown in FIG. 22.
Figure 24:
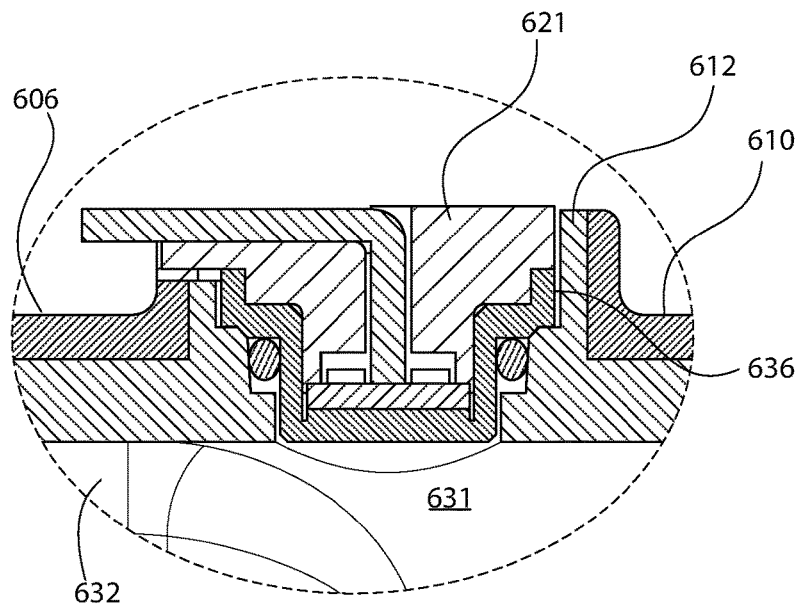
FIG. 24 is an enlarged view of the area '24' shown in FIG. 23.
Figure 25:
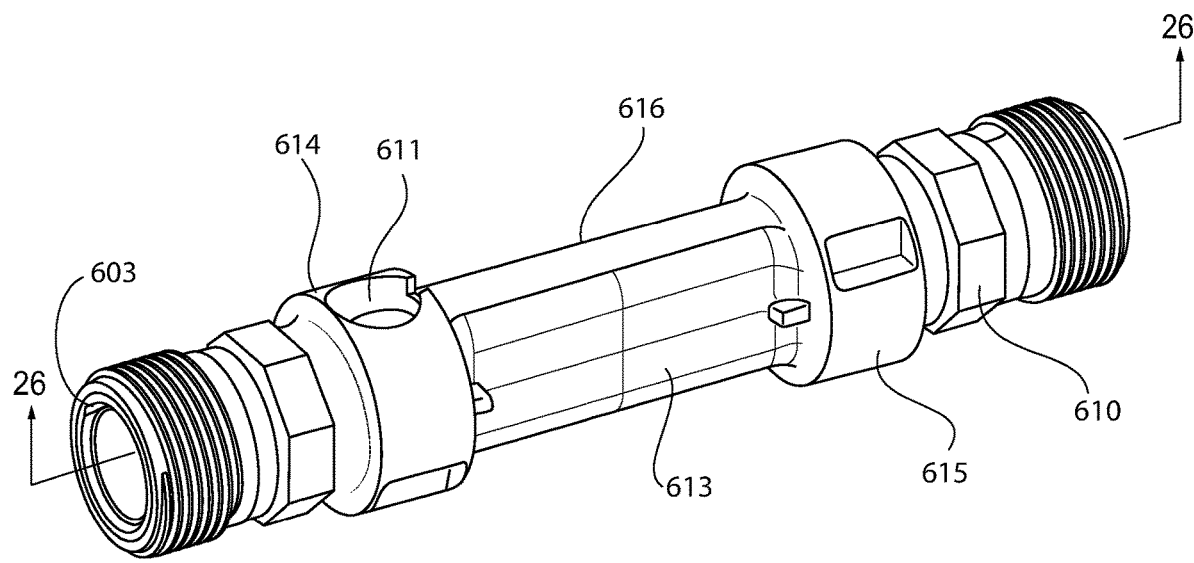
FIG. 25 is a perspective view of an outer pipe body of the ultrasonic flow meter of FIG. 22.
Figure 26:
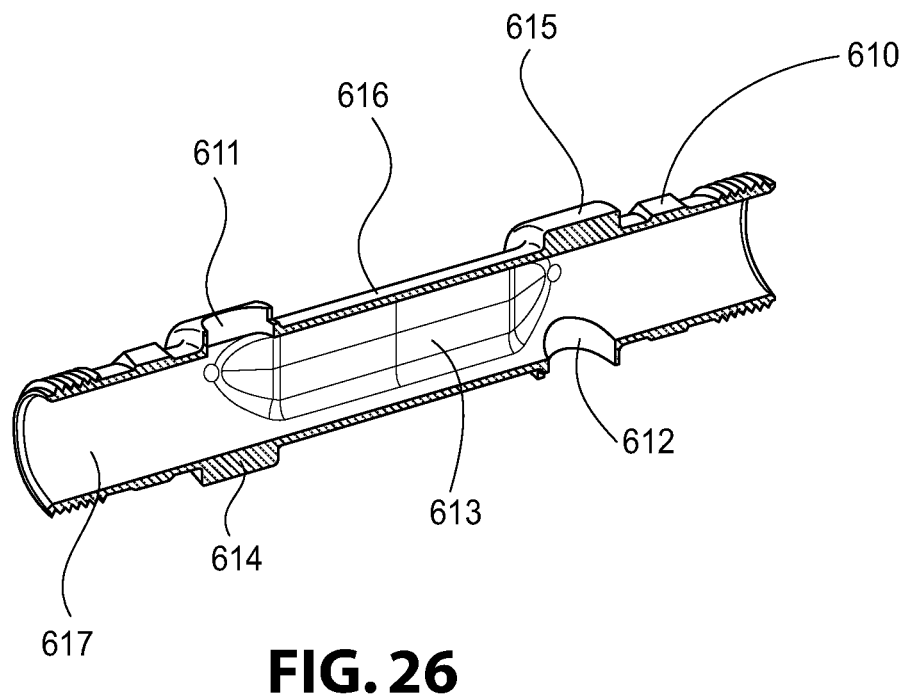
FIG. 26 is a cross-sectional view of the outer pipe body of FIG. 25 taken along lines 26-26 shown in FIG. 25.
Figure 27:
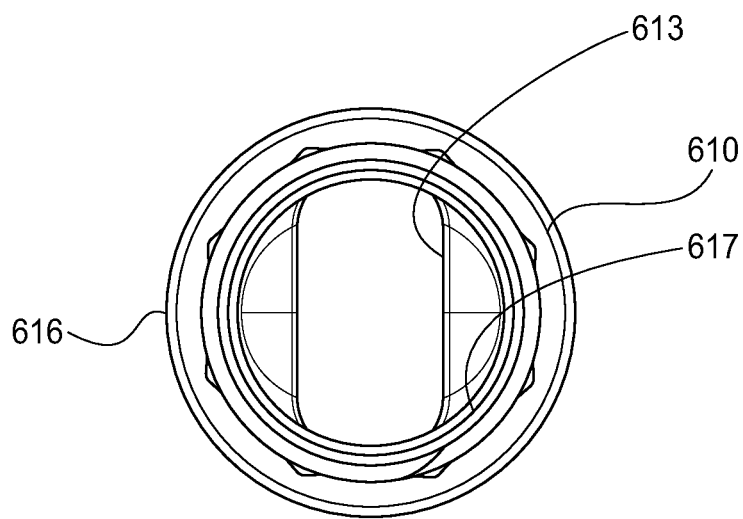
FIG. 27 is a front view of the outer pipe body of FIG. 25.

As shown in FIGS. 22 and 23 and as discussed above with reference to the examples of FIGS. 1-11, the ultrasonic transducers 620, 621 are disposed at opposing ends of the measurement section 632 on opposing sides 605, 606 of the tubular body 602. As shown in FIGS. 22-26, the outer pipe body 610 includes bands 614, 615 surrounding the exterior 616 of the outer pipe body 610. Each of the bands 614, 615 includes a respective aperture 611, 612 defined therein for receiving the transducers 620, 621 therein for supporting the transducers 620, 621 on the piping arrangement 601. As shown in FIGS. 22-24 and 28-30, during the injection molding process, the inner sleeve 630 is formed within the outer pipe body 610 to define recesses/apertures 635, 636 that extend upwardly into respective apertures 611, 612 of the outer pipe body 610 to define seats for the ultrasonic transducers 620, 621 and place the ultrasonic transducers 620, 621 in communication with the measurement section 632.

Figure 29:
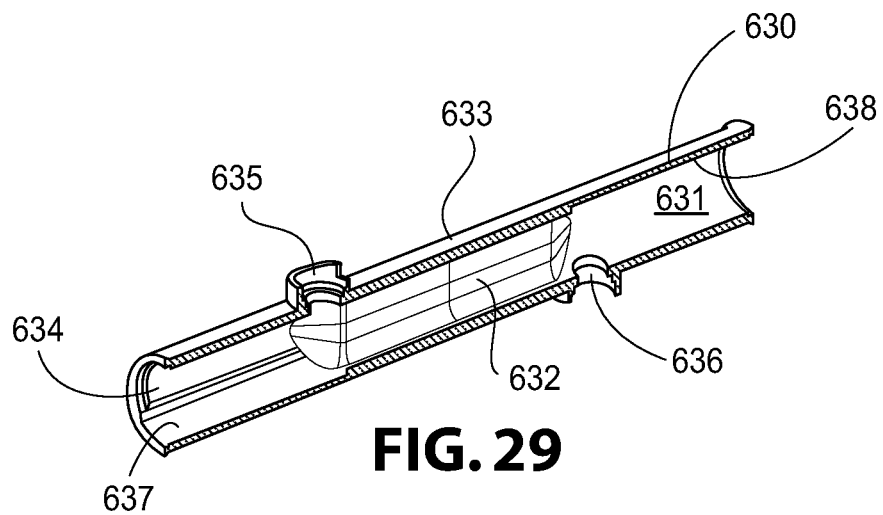
FIG. 29 is a cross-sectional view of the inner sleeve of FIG. 28 taken along lines 29-29 shown in FIG. 28.

As shown in FIGS. 23 and 29, the inner sleeve 630 is formed with a first slot 637 and a second slot 638 defined in the interior surface 634. The first and second slots 637, 638 are similar to the slots 217, 218 discussed above with reference to the example of FIGS. 7-11 and are configured to receive the brackets 231 supporting the reflective elements 230 within the fluid passage 631 at the ends of the measurement section 632.

According to an example of the present disclosure, the transducers 620, 621, reflective elements, and the measurement section 632 of the ultrasonic flow meter device 600 are arranged and configured to direct flow and transmit a Z-shaped ultrasonic wave in the same manner as the corresponding components of the ultrasonic flow meter devices 100, 200 discussed above with reference to FIGS. 1-11 such that the ultrasonic flow meter device 600 operates and measures flow in the same manner as the ultrasonic flow meter devices 100, 200 discussed above with reference to FIGS. 1-11. According to this example, the measurement section 632 has the same shape and configuration as the measurement sections 105, 205 of the above-discussed devices 100, 200. Also according to this example, the ultrasonic transducers 620, 621 are configured to communicate with a register (not shown) for measuring flow through the device 600 and transmitting measurement information to a utility, as discussed in detail above.

With reference to FIGS. 22-30, a process for manufacturing the ultrasonic flow meter device 600 is provided in accordance with an example of the present disclosure. The outer pipe body 610 made from the metallic material is provided. The outer pipe body 610 has a hollow interior that defines an interior surface 617. The outer pipe body 610 is placed within an injection molding machine and an inner sleeve 630 made from a polymeric material is injection molded onto the interior surface 617 of the outer pipe body 610. The outer pipe body 610 and the inner over-molded sleeve 630 form a piping arrangement 601 that includes a tubular body 602 extending along a longitudinal axis from a first end 603 to a second end 604 and a measurement section 632 disposed intermediate of the first end 603 and the second end 604. The tubular body 602 defines a fluid passage 631 extending along the longitudinal axis through the tubular body 602 from the first end 603 to the second end 604.

In particular, the outer pipe body 610 is shaped to provide definition to the fluid passage 631 and the measurement section 632. To that end, the outer pipe body 610 is formed with a central narrowed, oval-shaped portion 613 at the location of the measurement section 632. During the injection molding process, the polymeric material of the inner sleeve 630 is molded onto the interior surface 617 of the outer pipe body 610 to coat the interior surface 617 such that the inner sleeve 630 takes on a shape corresponding to the shape of the interior surface 617 of the outer pipe body 610 including the formation of the fluid passage 631, the measurement section 632, and the recesses/apertures 635, 636 for the ultrasonic transducers 620, 621. The first and second slots 637, 638 are also formed in the interior surface 634 of the inner sleeve 630 during the injection molding process. It is to be appreciated that during the injection molding process, the polymeric material at the exterior surface 633 of the inner sleeve 630 becomes adhered to or bonds with the material at the interior surface 617 of the outer pipe body 610 so as to completely seal the engagement between the inner sleeve 630 and the outer pipe body 610.

After completion of the injection molding process, the at least two ultrasonic transducers 620, 621 are assembled on opposing sides 605, 606 of the tubular body 602 and spaced apart along the longitudinal axis, and at least two reflective elements (not shown in FIGS. 22-30) are assembled on the opposing sides 605, 606 of the tubular body 602 and spaced apart along the longitudinal axis.

Figure 28:
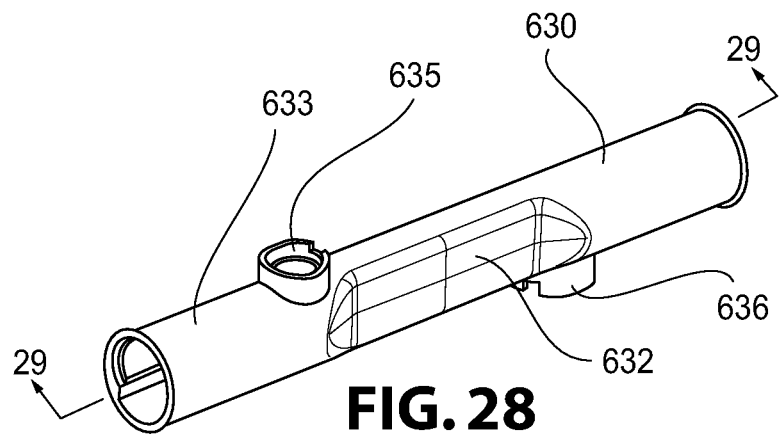
FIG. 28 is a perspective view of an inner sleeve of the ultrasonic flow meter of FIG. 22.
Figure 30:
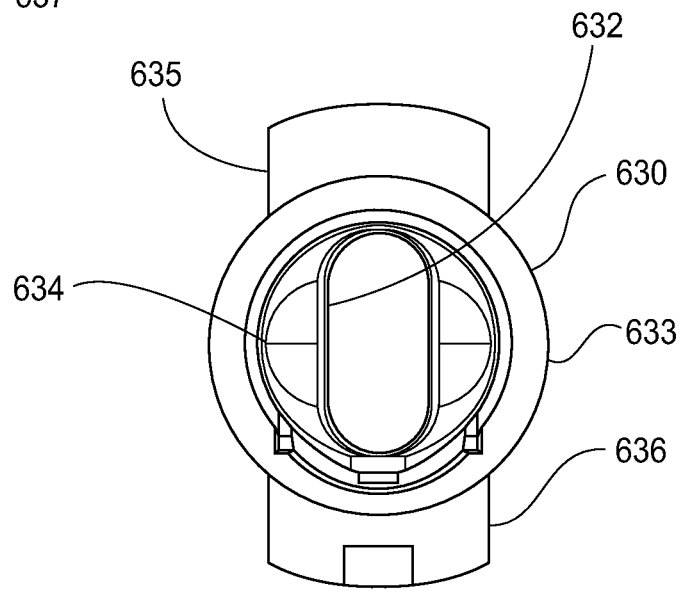
FIG. 30 is a front view of the inner sleeve of FIG. 28.

It is to be appreciated that FIGS. 28-30 are provided for illustrative purposes only to provide details of the shape features of the inner sleeve 630 by itself. However, the inner sleeve 630 is only formed within the outer pipe body 610 and is not made as a separate component from the outer pipe body 610. It is to be appreciated that the specific parameters of the injection molding process for over molding the inner sleeve 630 within the outer pipe body 610 may be selected as being most suitable according those having ordinary skill in the art to form the piping arrangement 601 according to the correct specifications and within tolerances.

Figure 31:
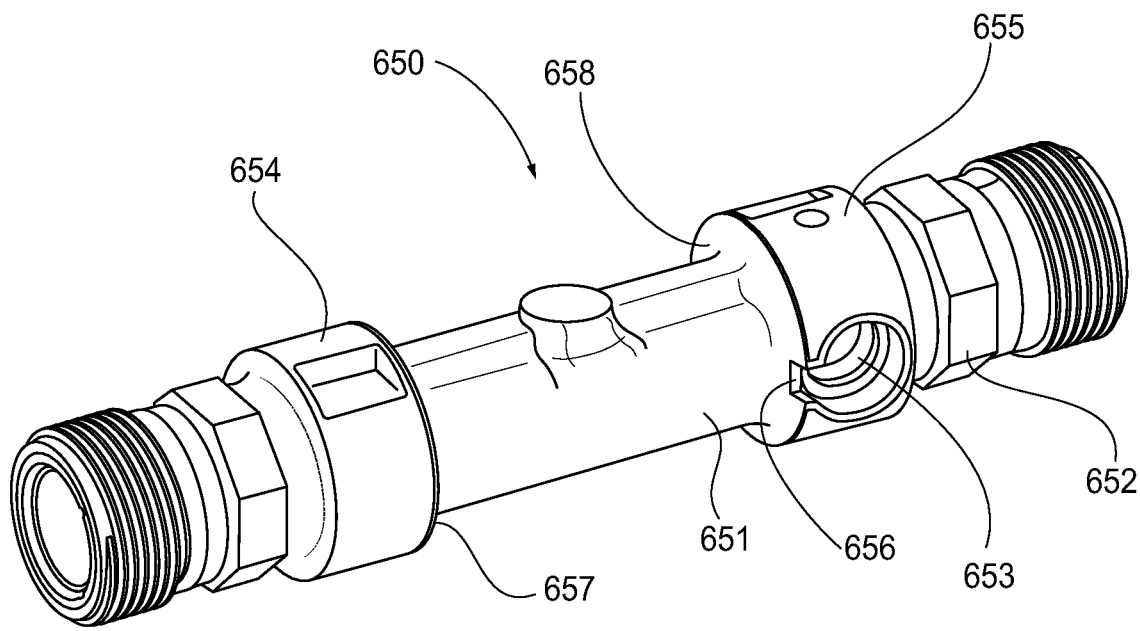
FIG. 31 is a perspective view of an ultrasonic flow meter in accordance with another example of the present disclosure.
Figure 32:
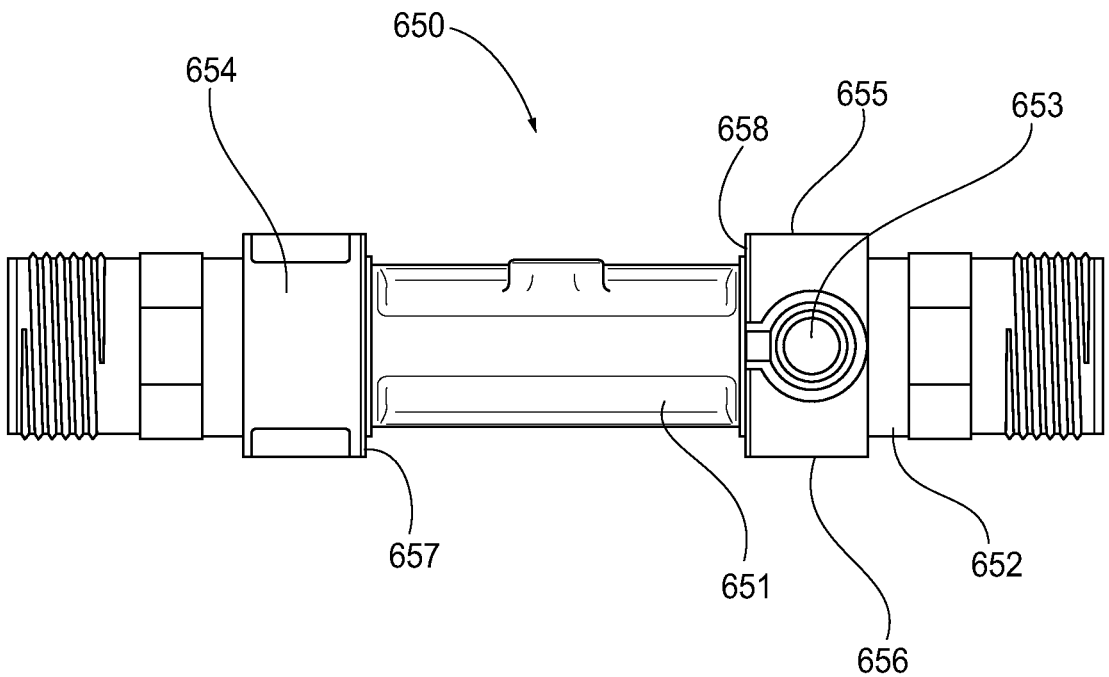
FIG. 32 is a side view of the ultrasonic flow meter of FIG. 31.
Figure 33:
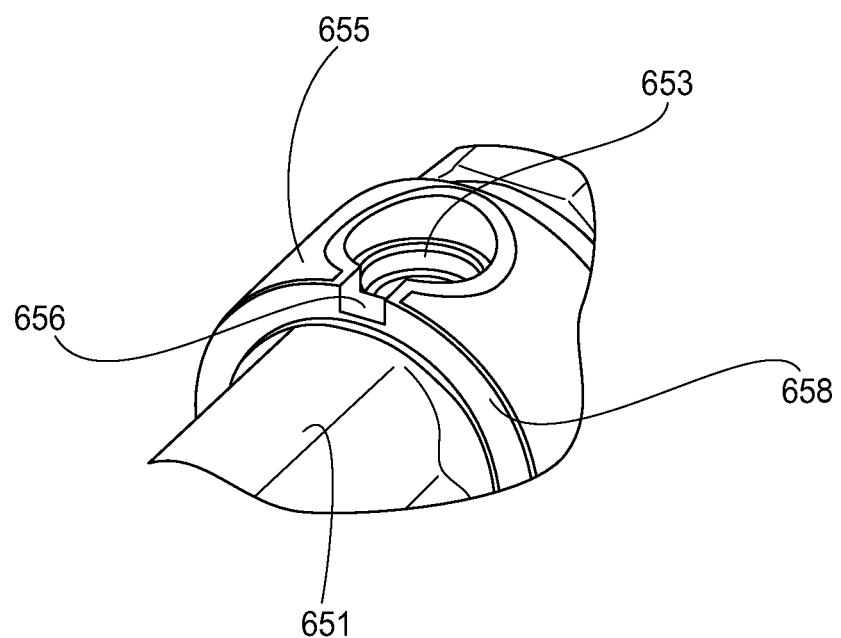
FIG. 33 is an enlarged perspective view of a portion of the ultrasonic flow meter of FIG. 31.

With reference to FIGS. 31-33, an alternative piping arrangement 650 for use in connection with the ultrasonic flow meter device 600 described above in connection with FIGS. 22-30 is shown in accordance with another example of the present disclosure. The piping arrangement 650 includes a tubular body 651 formed from an outer metal pipe 652 and an inner sleeve constructed in accordance with the principles discussed above with reference to the tubular body 602 described in connection with FIGS. 22-30. The outer metal pipe 652 includes bands 654, 655 on the exterior thereof that define apertures that accommodate the seats 653 formed in the inner sleeve for positioning of the ultrasonic transducers 620, 621 on the tubular body 651 in communication with the measurement section 632, as discussed above. A recess 656 is formed in each of the bands 654, 655 that allows for sensor cables of the ultrasonic transducers 620, 621 to pass through the bands 654, 655 from the apertures 635, 636 to sides of the bands 654, 655 facing toward the longitudinal center of the tubular body 651 without protruding from the outer circumference of the bands 654, 655. Plastic rings 657, 658 are also disposed around the exterior of the tubular body 651 and affixed to the sides of the bands 654, 655 facing the longitudinal center of the tubular body 651. As shown in FIGS. 31-33, the recess 656 may be lined with the plastic material of the inner sleeve. Accordingly, the sensor cables of the ultrasonic transducers 620, 621 are electrically insulated from the metal material of the bands 654, 655 of the outer metal pipe 652 as they pass through and away from the bands 654, 655 toward the longitudinal center of the tubular body 651.

Further examples of the present disclosure will now be described in the following number clauses.

Clause 1: An ultrasonic flow meter device (600), comprising: a piping arrangement (601, 650) comprising a tubular body (602, 651) extending along a longitudinal axis from a first end (603) to a second end (604) and including a measurement section (632) disposed intermediate the first end (603) and the second end (604), the tubular body (602, 651) defining a fluid passage (631) extending along the longitudinal axis through the tubular body (602, 651) from the first end (603) to the second end (604); at least two ultrasonic transducers (620, 621) disposed on opposing sides (605, 606) of the tubular body (602, 651) and spaced apart along the longitudinal axis; and at least two reflective elements (230) disposed on the opposing sides (605, 606) of the tubular body (602, 651) and spaced apart along the longitudinal axis, wherein the piping arrangement (601, 650) comprises: an outer pipe body (610, 652) made from a metallic material; and an inner sleeve (630) made from a polymeric material, the inner sleeve (630) being disposed within the outer pipe body (610, 652), wherein the inner sleeve (630) is over molded within the outer pipe body (610, 652), and wherein the inner sleeve (630) defines the measurement section (632) and the fluid passage (631) of the piping arrangement (601, 650).

Clause 2: The ultrasonic flow meter device (600) according to Clause 1, wherein the outer pipe body (610) includes a narrowed portion (613) that defines the measurement section (632) in the molded inner sleeve (630).

Clause 3: The ultrasonic flow meter device (600) according to Clause 2, wherein the fluid passage (631) has a circular shape at the first end (603) and the second end (604) and an oblong circular shape in the measurement section (632), and wherein a first width (w1) of the fluid passage (631) at the first end (603) and the second end (604) is larger than a second width (w2) of the fluid passage (631) in the measurement section (632), and a cross-sectional area of the fluid passage (631) at the first end (603) and the second end (604) is the same as a cross-sectional area of the fluid passage (631) in the measurement section (632).

Clause 4: The ultrasonic flow meter device (600) according to any one of Clauses 1-3, wherein the at least two ultrasonic transducers (620, 621) are configured to generate and/or receive an ultrasonic sound wave, and the at least two reflective elements (230) are configured to direct the ultrasonic sound wave through the fluid passage (631) in the measurement section (632) of the tubular body (602, 651) from one of the at least two ultrasonic transducers (620, 621) to another of the at least two ultrasonic transducers (620, 621) in a travel path that is substantially Z-shaped.

Clause 5: The ultrasonic flow meter device (600) according to any one of Clauses 1-4, wherein the polymeric material of the inner sleeve (630) bonds with the metallic material of the outer pipe body (610, 652) to form a sealed engagement between the inner sleeve (630) and the outer pipe body (610, 652).

Clause 6: The ultrasonic flow meter device (600) according to any one of Clauses 1-5, wherein the outer pipe body (610, 652) comprises at least two apertures (611, 612) defined therein and the inner sleeve (630) comprises at least two seats (635, 636, 653) formed therein that each extend into a respective one of the at least two apertures (611, 612), and wherein the at least two apertures (611, 612) in the outer pipe body (610) and the at least two seats (635, 636, 653) in the inner sleeve (630) are configured to receive and support the at least two ultrasonic transducers (620, 621) therein and place the at least two ultrasonic transducers (620, 621) in communication with the measurement section (632).

Clause 7: The ultrasonic flow meter device (600) according to Clause 6, wherein the outer pipe body (652) comprises at least two recesses (656) defined therein adjacent to the at least two apertures (611, 612) and the polymeric material of the inner sleeve (630) lines the at least two recesses (656), the at least two recesses (656) being configured to allow sensor cables from the at least two ultrasonic transducers (620, 621) to pass therethrough.

Clause 8: The ultrasonic flow meter device (600) according to any one of Clauses 1-7, wherein each of the at least two reflective elements (230) is disposed on a respective bracket (231) inserted in the fluid passage (631).

Clause 9: The ultrasonic flow meter device (600) according to Clause 8, wherein each bracket (231) is removably inserted in a slot (637, 638) defined in an interior surface (634) of the inner sleeve (630) and extending along the longitudinal axis from a respective one of the first end (603) and the second end (604) of the tubular body (602, 651) to the measurement section (632).

Clause 10: The ultrasonic flow meter device (600) according to any one of Clauses 1-9, wherein the metallic material comprises stainless steel, brass, or bronze.

Clause 11: A method of manufacturing an ultrasonic flow meter device (600), the method comprising: providing an outer pipe body (610, 652) made from a metallic material, the outer pipe body (610, 652) having a hollow interior defining an interior surface (617); injection molding an inner sleeve (630) made from a polymeric material onto the interior surface (617) of the outer pipe body (610, 652), wherein the outer pipe body (610, 652) and the inner sleeve (630) form a piping arrangement (601, 650) comprising a tubular body (602, 651) extending along a longitudinal axis from a first end (603) to a second end (604) and including a measurement section (632) disposed intermediate the first end (603) and the second end (604), the tubular body (602, 651) defining a fluid passage (631) extending along the longitudinal axis through the tubular body (602, 651) from the first end (603) to the second end (604); assembling at least two ultrasonic transducers (620, 621) on opposing sides (605, 606) of the tubular body (602, 651) and spaced apart along the longitudinal axis; and assembling at least two reflective elements (230) on the opposing sides (605, 606) of the tubular body (602, 651) and spaced apart along the longitudinal axis.

Clause 12: The method according to Clause 11, wherein the inner sleeve (630) is injection molded onto the interior surface (617) of the outer pipe body (610, 652) so as to form a sealed engagement between the inner sleeve (630) and the outer pipe body (610, 652).

Clause 13: The method according to Clause 11 or Clause 12, wherein the outer pipe body (610) includes a narrowed portion (613) that defines the measurement section (632) in the molded inner sleeve (630).

Clause 14: The method according to Clause 13, wherein the fluid passage (631) has a circular shape at the first end (603) and the second end (604) and an oblong circular shape in the measurement section (632), and wherein a first width (w1) of the fluid passage (631) at the first end (603) and the second end (604) is larger than a second width (w2) of the fluid passage (631) in the measurement section (632), and a cross-sectional area of the fluid passage (631) at the first end (603) and the second end (604) is the same as a cross-sectional area of the fluid passage (631) in the measurement section (632).

Clause 15: The method according to any one of Clauses 11-14, wherein the at least two ultrasonic transducers (620, 621) are configured to generate and/or receive an ultrasonic sound wave, and the at least two reflective elements (230) are configured to direct the ultrasonic sound wave through the fluid passage (631) in the measurement section (632) of the tubular body (602, 651) from one of the at least two ultrasonic transducers (620, 621) to another of the at least two ultrasonic transducers (620, 621) in a travel path that is substantially Z-shaped.

Clause 16: The method according to any one of Clauses 11-15, wherein the outer pipe body (610, 652) comprises at least two apertures (611, 612) defined therein and during the injection molding step, the inner sleeve (630) is molded to form at least two seats (635, 636, 653) that each extend into a respective one of the at least two apertures (611, 612), and wherein the at least two apertures (611, 612) in the outer pipe body (610, 652) and the at least two seats (635, 636, 653) in the inner sleeve (630) are configured to receive and support the at least two ultrasonic transducers (620, 621) therein and place the at least two ultrasonic transducers (620, 621) in communication with the measurement section (632).

Clause 17: The method according to Clause 16, wherein the outer pipe body (652) comprises at least two recesses (656) defined therein adjacent to the at least two apertures (611, 612) and during the injection molding step, the inner sleeve (630) is molded to line the at least two recesses (656) in the outer pipe body (652), the at least two recesses (656) being configured to allow sensor cables from the at least two ultrasonic transducers (620, 621) to pass therethrough.

Clause 18: The method according to any one of Clauses 11-17, wherein each of the at least two reflective elements (230) is disposed on a respective bracket (231) inserted in the fluid passage (631).

Clause 19: The method according to Clause 18, wherein each bracket (231) is removably inserted in a slot (637, 638) defined in an interior surface (634) of the inner sleeve (630) and extending along the longitudinal axis from a respective one of the first end (603) and the second end (604) of the tubular body (602, 651) to the measurement section (632).

Clause 20: The method according to any one of Clauses 11-19, wherein the metallic material comprises stainless steel, brass, or bronze.

Clause 21: An ultrasonic flow meter device (500), comprising: a piping arrangement (501) comprising a tubular body (502) extending along a longitudinal axis from a first end (503) to a second end (504) and including a measurement section (532) disposed intermediate the first end (503) and the second end (504), the tubular body (502) defining a fluid passage (531) extending along the longitudinal axis through the tubular body (502) from the first end (503) to the second end (504); at least two ultrasonic transducers (523, 524) disposed on opposing sides (506, 507) of the tubular body (502) and spaced apart along the longitudinal axis; and at least two reflective elements (230) disposed on the opposing sides (506, 507) of the tubular body (502) and spaced apart along the longitudinal axis, wherein the piping arrangement (501) comprises: an outer pipe body (510) made from a metallic material; an inner sleeve (530) made from a polymeric material, the inner sleeve (530) being disposed within the outer pipe body (510); and a fastener (525) configured to secure the inner sleeve (530) within the outer pipe body (510), wherein the inner sleeve (530) defines the measurement section (532) and the fluid passage (531) of the piping arrangement (501), wherein the outer pipe body (510) and the inner sleeve (530) comprise corresponding apertures (511, 512, 535, 536) that define seats for the at least two ultrasonic transducers (523, 524) and that place the ultrasonic transducers (523, 524) in communication with the measurement section (532), and wherein the outer pipe body (510) comprises an aperture (513) and the inner sleeve (530) comprises a corresponding recess (537) configured to receive the fastener (525).

Clause 22: The ultrasonic flow meter device according to Clause 21, wherein the metallic material comprises stainless steel, brass, or bronze.

Clause 23: The ultrasonic flow meter device according to Clause 21 or Clause 22, further comprising a sealing gasket (538) disposed between the outer pipe body (510) and the inner sleeve (530), the sealing gasket (538) being configured to seal an engagement between an inner surface (517) of the outer pipe body (510) and an exterior surface (533) of the inner sleeve (530).

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects but, on the contrary, is intended to cover modifications and equivalent arrangements that are within the spirit and scope thereof. For example, it is to be understood that the present invention contemplates that to the extent possible, one or more features of any embodiment or aspect can be combined with one or more features of any other embodiment or aspect.

The invention claimed is:

1. An ultrasonic flow meter device, comprising:
   a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;
   at least two ultrasonic transducers disposed on opposing sides of the tubular body and spaced apart along the longitudinal axis; and
   at least two reflective elements disposed on the opposing sides of the tubular body and spaced apart along the longitudinal axis,
   wherein the piping arrangement comprises:
   an outer pipe body made from a metallic material; and
   an inner sleeve made from a polymeric material, the inner sleeve being disposed within the outer pipe body,
   wherein the inner sleeve is over molded within the outer pipe body,
   wherein the inner sleeve defines the measurement section and the fluid passage of the piping arrangement,
   wherein the outer pipe body comprises at least two apertures defined therein and the inner sleeve comprises at least two seats formed therein that each extend into a respective one of the at least two apertures, and
   wherein the at least two apertures in the outer pipe body and the at least two seats in the inner sleeve are configured to receive and support the at least two ultrasonic transducers therein and to place the at least two ultrasonic transducers in communication with the measurement section, the at least two seats in the inner sleeve being at least partially defined by apertures formed in the inner sleeve.

2. The ultrasonic flow meter device according to claim 1, wherein the outer pipe body includes a narrowed portion that defines the measurement section in the molded inner sleeve.

3. The ultrasonic flow meter device according to claim 2, wherein the fluid passage has a circular shape at the first end and the second end and an oblong circular shape in the measurement section, and
   wherein a first width of the fluid passage at the first end and the second end is larger than a second width of the fluid passage in the measurement section, and a cross-sectional area of the fluid passage at the first end and the second end is the same as a cross-sectional area of the fluid passage in the measurement section.

4. The ultrasonic flow meter device according to claim 1, wherein the at least two ultrasonic transducers are configured to generate and/or receive an ultrasonic sound wave, and the at least two reflective elements are configured to direct the ultrasonic sound wave through the fluid passage in the measurement section of the tubular body from one of the at least two ultrasonic transducers to another of the at least two ultrasonic transducers in a travel path that is substantially Z-shaped.

5. The ultrasonic flow meter device according to claim 1, wherein the polymeric material of the inner sleeve bonds with the metallic material of the outer pipe body to form a sealed engagement between the inner sleeve and the outer pipe body.

6. The ultrasonic flow meter device according to claim 1, wherein the outer pipe body comprises at least two recesses defined therein adjacent to the at least two apertures and the polymeric material of the inner sleeve lines the at least two recesses, the at least two recesses being configured to allow sensor cables from the at least two ultrasonic transducers to pass therethrough.

7. The ultrasonic flow meter device according to claim 1, wherein each of the at least two reflective elements is disposed on a respective bracket inserted in the fluid passage.

8. The ultrasonic flow meter device according to claim 7, wherein each bracket is removably inserted in a slot defined in an interior surface of the inner sleeve and extending along the longitudinal axis from a respective one of the first end and the second end of the tubular body to the measurement section.

9. The ultrasonic flow meter device according to claim 1, wherein the metallic material comprises stainless steel, brass, or bronze.

10. An ultrasonic flow meter device, comprising:
- a piping arrangement comprising a tubular body extending along a longitudinal axis from a first end to a second end and including a measurement section disposed intermediate the first end and the second end, the tubular body defining a fluid passage extending along the longitudinal axis through the tubular body from the first end to the second end;
- at least two ultrasonic transducers disposed on opposing sides of the tubular body and spaced apart along the longitudinal axis; and
- at least two reflective elements disposed on the opposing sides of the tubular body and spaced apart along the longitudinal axis, wherein the piping arrangement comprises:
- an outer pipe body made from a metallic material;
- an inner sleeve made from a polymeric material, the inner sleeve being disposed within the outer pipe body; and
- a fastener configured to secure the inner sleeve within the outer pipe body, wherein the inner sleeve defines the measurement section and the fluid passage of the piping arrangement, wherein the outer pipe body and the inner sleeve comprise corresponding apertures that define seats for the at least two ultrasonic transducers and that place the ultrasonic transducers in communication with the measurement section, and wherein the outer pipe body comprises an aperture and the inner sleeve comprises a corresponding recess configured to receive the fastener.

11. The ultrasonic flow meter device according to claim 10, wherein the metallic material comprises stainless steel, brass, or bronze.

12. The ultrasonic flow meter device according to claim 10, further comprising a sealing gasket disposed between the outer pipe body and the inner sleeve, the sealing gasket being configured to seal an engagement between an inner surface of the outer pipe body and an exterior surface of the inner sleeve.

* * * * *